US008433448B2

(12) United States Patent
Walker et al.

(10) Patent No.: US 8,433,448 B2
(45) Date of Patent: *Apr. 30, 2013

(54) SAME CODE BASE IN IRRIGATION CONTROL DEVICES AND RELATED METHODS

(75) Inventors: Ryan L. Walker, San Diego, CA (US); David E. Columbo, San Diego, CA (US); Whitney M. Kew, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 487 days.

This patent is subject to a terminal disclaimer.

(21) Appl. No.: 11/421,054

(22) Filed: May 30, 2006

(65) Prior Publication Data

US 2007/0282486 A1 Dec. 6, 2007

(51) Int. Cl.
*G05D 11/00* (2006.01)
*G05D 7/00* (2006.01)

(52) U.S. Cl.
USPC .............. 700/284; 709/228; 239/63; 239/99; 137/78.2

(58) Field of Classification Search .................. 700/284, 700/3–5; 137/78.2, 78.3; 239/63, 64, 69, 239/70, 99; 709/228; 703/9
See application file for complete search history.

(56) References Cited

U.S. PATENT DOCUMENTS

| | | | |
|---|---|---|---|
| 4,626,984 A | 12/1986 | Unruh et al. | |
| 5,173,855 A | 12/1992 | Nielsen et al. | |
| 5,479,339 A | 12/1995 | Miller | |
| 5,699,244 A | 12/1997 | Clark, Jr. et al. | |
| 5,740,031 A | 4/1998 | Gagnon | |
| 6,061,603 A | 5/2000 | Papadopoulos et al. | |
| 6,088,621 A | 7/2000 | Woytowitz et al. | |
| 6,108,590 A | 8/2000 | Hergert | |
| 6,282,572 B1 * | 8/2001 | Dahlin et al. | 709/228 |
| 6,314,340 B1 | 11/2001 | Mecham et al. | |
| 6,600,971 B1 | 7/2003 | Smith et al. | |
| 6,721,630 B1 | 4/2004 | Woytowitz | |
| 6,823,239 B2 | 11/2004 | Sieminski | |
| 7,269,829 B2 * | 9/2007 | Smith et al. | 717/168 |
| 7,328,089 B2 | 2/2008 | Curren | |
| 2002/0002425 A1 | 1/2002 | Dossey et al. | |
| 2003/0093159 A1 | 5/2003 | Sieminski | |
| 2003/0179102 A1 | 9/2003 | Barnes | |

(Continued)

OTHER PUBLICATIONS

USPTO; U.S. Appl. No. 11/421,058; Office Action, mailed Nov. 24, 2008.

(Continued)

*Primary Examiner* — Mohammad Ali
*Assistant Examiner* — Sheela S Rao
(74) *Attorney, Agent, or Firm* — Fitch, Even, Tabin & Flannery, LLP

(57) ABSTRACT

Various embodiments are described in which different irrigation controllers in an irrigation control system have machine code having a same code base. In one implementation, a first irrigation control unit comprises a processor and a medium storing a first set of machine code to be executed by the processor. The first set is based on a portion of source code on which a second set of machine code stored in a second irrigation control unit is based, and the first and second sets not identical to each other. The first and second irrigation control units are in a predefined hierarchical control relationship. In one variation, the first and second control units have at least related operating systems. In another variation, a central controller includes machine code developed from at least a portion of the same source code as machine code in a remote controller for simulation or execution purposes.

22 Claims, 9 Drawing Sheets

U.S. PATENT DOCUMENTS

| | | | |
|---|---|---|---|
| 2004/0015270 A1 | 1/2004 | Addink et al. | |
| 2004/0039489 A1 | 2/2004 | Moore et al. | |
| 2004/0181315 A1 | 9/2004 | Cardinal et al. | |
| 2004/0236443 A1* | 11/2004 | Ware et al. | 700/90 |
| 2005/0031416 A1 | 2/2005 | Bishop, Jr. | |
| 2005/0085928 A1 | 4/2005 | Shani | |
| 2005/0171646 A1 | 8/2005 | Miller | |
| 2005/0184879 A1 | 8/2005 | McPherson et al. | |
| 2005/0203669 A1* | 9/2005 | Curren | 700/284 |
| 2008/0125917 A1 | 5/2008 | Walker | |

OTHER PUBLICATIONS

USPTO; U.S. Appl. No. 11/421,058; Office Action, mailed Sep. 30, 2008.

USPTO; U.S. Appl. No. 11/421,058; Office Action, mailed Aug. 20, 2009.

USPTO; U.S. Appl. No. 11/421,058; Advisory Action mailed Oct. 25, 2010.

USPTO; U.S. Appl. No. 11/421,058; Office Action mailed Jun. 2, 2010.

USPTO; U.S Appl. No. 11/421,058; Interview Summary mailed Oct. 28, 2011.

USPTO; U.S. Appl. No. 11/421,058; Notice of Allowance mailed Oct. 26, 2011.

USPTO; U.S. Appl. No. 11/421,058; Office Action mailed Apr. 4, 2011.

* cited by examiner

SAME CODE BASE IN IRRIGATION CONTROL DEVICES AND RELATED METHODS

This application relates to subject matter of U.S. patent application Ser. No. 11/421,058, of Walker, et al.; entitled SAME CODE BASE IN IRRIGATION CONTROL DEVICES AND RELATED METHODS; which is filed concurrently herewith and which is incorporated herein by reference.

BACKGROUND OF THE INVENTION

1. Field of the Invention

The present invention relates generally to irrigation control, and more specifically to the operating instructions of programmable irrigation controller devices.

2. Discussion of the Related Art

In complex central control irrigation systems, a personal computer (PC) based central controller is used to develop irrigation schedules for one or more remote satellite irrigation controllers variously located in the field and each coupled to flow control devices, such as a valves, that control the flow of water to one or more watering devices, such as sprinklers. These PC-based central controllers usually comprise a personal computer operating in accordance with an operating system, such as MICROSOFT WINDOWS XP®. A central control software application designed for the operating system of the PC is installed on the PC and executed. This central control application allows an irrigation system manager to program and manage watering schedules for one or more satellite irrigation controllers. Many central control applications account for weather information that is entered or received at the PC. Some central control applications have advanced features to assist the manager in controlling the system, such as a dry run simulation feature.

The satellite controllers or field controllers, on the other hand, are specific purpose computing devices that operate according to a specially designed operating system. In other words, these satellite irrigation controllers are not general purpose PC-based devices. The instruction set controlling the operation of the satellite controllers is derived from source code written specifically for that operating environment and which is stored as firmware in read only memory of the satellite controller. This instruction set is executed by a processor of the satellite controller to run the satellite controller. Due to the fact that the central controller and the satellite controllers run on different operating systems, simulations of the functionality of a satellite controller by the central controller can lead to inaccurate results. Typically, a satellite controller is configured to receive and execute watering schedules or watering instructions generated by the central controller. In some cases, the satellite controller is capable of functioning on its own to control irrigation when not connected to a central controller.

SUMMARY OF THE INVENTION

Several embodiments of the invention provide different irrigation controllers in an irrigation control system that contains at least some portion of machine code that shares a same code base.

In one embodiment, the invention can be characterized as a first irrigation control unit comprising a processor and a computer readable medium coupled to the processor and storing a first set of machine code adapted to be executed by the processor. The first set of machine code is based on a portion of source code on which a second set of machine code stored in a second irrigation control unit is based. The first set of machine code and the second set of machine code are not identical to each other, and the second irrigation control unit have a predefined hierarchical control relationship with the first irrigation control unit.

In another embodiment, the invention can be characterized as a method of operation in irrigation control comprising the steps: retrieving a first set of machine code stored in a first irrigation control unit that is based on a portion of source code on which a second set of machine code stored in a second irrigation control unit is based, the first set of machine code and the second set of machine code not identical to each other, the second irrigation control unit having a predefined hierarchical control relationship with the first irrigation control unit; and executing the first set of machine code.

In a further embodiment, the invention may be characterized as a first irrigation control unit comprising a processor; and a computer readable medium coupled to the processor and storing a first set of machine code adapted to be executed by the processor to implement a first operating system. The first operating system is at least related to a general purpose computer operating system of a general purpose computer functioning as a second irrigation control unit having a predefined hierarchical control relationship with the first irrigation control unit.

In yet another embodiment, the invention may be characterized as a first irrigation control unit comprising a processor; and a computer readable medium coupled to the processor and storing operating system machine code adapted to be executed by the processor to implement a first operating system. The computer readable medium stores application machine code including a first set of machine code adapted to be executed by the processor and that is based on a portion of source code on which a second set of machine code stored in a second irrigation control unit operating in accordance with a second operating system is based, the second set of machine code adapted for use in the second operating system and to accomplish an irrigation control function when executed. The first set of machine code and the second set of machine code are not identical to each other, and the processor is adapted to execute the application machine code to execute the irrigation control function in the first operating system by executing the first set of machine code.

In another embodiment, the invention can be characterized as a device for use in irrigation control comprising a computer readable medium storing application machine code adapted to be executed by a processor of a first irrigation control unit operating in accordance with a first operating system. The application machine code includes a first set of machine code adapted to be executed by the processor and that is based on a portion of source code on which a second set of machine code stored in a second irrigation control unit operating in accordance with a second operating system is based, the second set of machine code adapted for use in the second operating system and to accomplish an irrigation control function when executed, the first set of machine code and the second set of machine code are not identical to each other. Upon execution by the processor, the application machine code is adapted to execute the irrigation control function in the first operating system by executing the first set of machine code.

In a further embodiment, the invention may be characterized as a method of operation for irrigation control comprising the steps: executing application machine code stored in a first irrigation control unit operating in accordance with a first operating system; retrieving a first set of machine code stored in the first irrigation control unit and that is based on a portion of source code on which a second set of machine code stored in a second irrigation control unit operating in accordance with a second operating system is based, the second set of machine code adapted for use in the second operating system and to accomplish an irrigation control function when executed, the first set of machine code and the second set of machine code are not identical to each other; and executing the first set of machine code to execute the irrigation control function in the first operating system.

In yet another embodiment, the invention may be characterized as a method of simulating a function for irrigation control comprising the steps: obtaining a copy of a portion of source code which is the basis for a first set of machine code adapted for execution by a processor of a first irrigation control unit that operates in accordance with a first operating system, the portion of the source code adapted to accomplish an irrigation control function when the first set of machine code is executed; copying the portion of the source code to a code development environment for a second operating system; and developing executable application machine code compatible with the second operating system and containing a second set of machine code corresponding to the portion of the source code having been obtained and copied, the executable application machine code adapted to be executed by a processor of a second irrigation control unit operating in accordance with the second operating system. The first set of machine code and the second set of machine code are not identical to each other.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
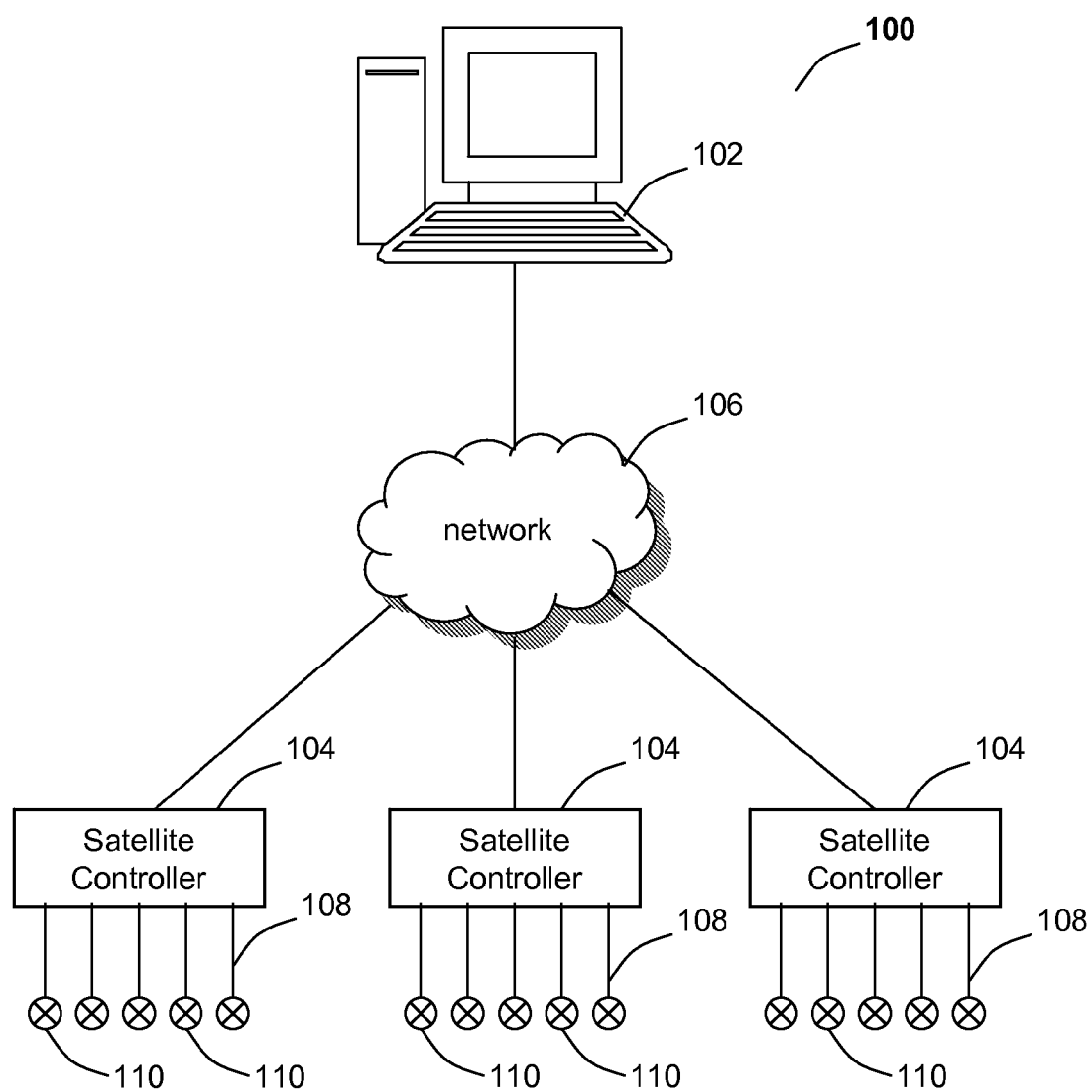
FIG. 1 is a diagram of a central control based irrigation control system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Referring first to FIG. 1, a diagram is shown of an irrigation system 100 according to some embodiments. The system 100 includes an irrigation system central controller 102 (referred to generically as an irrigation control unit) coupled to multiple remotely located satellite controllers 104 (each controller also generically referred to as an irrigation control unit) via a network 106. Each satellite controller 104 includes actuation lines 108 coupled to multiple irrigation stations 110 that each control the flow of water to one or more watering devices, such as sprinklers, rotors, drip-lines, and/or other water delivery devices. It is understood that the actuation lines 108 may be any wired connection, or in some embodiments, may be implemented as wireless connections. Furthermore, the irrigation stations 110 may also be used for the activation of a solenoid for any purpose, for example, to activate lighting, gate control, etc.

In the illustrated embodiment, the central controller 102 takes the form of a personal computer which can be generically referred to as a general purpose computer device. The central controller generally includes one or more microprocessors that execute software comprising code (executable machine code) stored in memory of the central controller 102, the code comprising a set of instructions to be executed by a processor. The software includes the operating system software of the computer device and any other functional programming. In the case of a central controller 102 of a central control based irrigation control system, the personal computer stores and executes central irrigation control application software. Thus, in this embodiment, the central controller 102 is a general purpose computer device running a central irrigation control application. The central control application includes many functions, including allowing a user to program and manage watering schedules for any number of satellite controllers 104, receive weather information and make adjusts to watering schedules, communicate with the satellite controllers, receive data from the satellite controllers regarding their status, etc.

The central controller 102 is coupled to the satellite controllers 104 via the network 106. The network can be any combination of wired and/or wireless connections and interfaces known to connect computer devices. For example, the network may be a simple network of wiring (such as a local area network) that connects to an Ethernet port of the central controller 102. The network 106 may include telephone lines coupled to the central controller with an appropriate modem. The network 106 may also include radio, paging, or cellular wireless communication links.

The remotely located satellite controllers 104 are specific purpose computing devices that operate according to a specially designed operating system and set of programmed instructions specifically developed for the application as a satellite irrigation controller. The instruction set controlling the operation of the satellite controllers is derived from source code written specifically for that operating environment and which is translated into machine code stored as firmware in memory (e.g., read only memory (ROM), random access memory (RAM), flash memory, hard drive, etc.) of the satellite controller 104. This machine code or firmware is executed by a processor of the satellite controller to run the satellite controller. Some satellite controllers 104 have a user interface (e.g., buttons, switches, dials, display screen, etc.) that allow a user to program a watering schedule directly into satellite controller. Typically, in a central control application, a satellite controller is configured to receive, store and execute watering schedules or watering instructions generated by the central controller 102. In some cases, a satellite controller 104 with a user interface can operate as a "stand alone" controller when not connected to a central controller 102. In order to cause irrigation, the microprocessor of the satellite controllers 104 outputs control signaling to output circuitry that switches power to one or more of the actuation lines 108 (which in alternative embodiments are replaced by a wireless link such that the actuation lines 108 may be wired or wireless). In response, the valves 110 coupled to the respective actuation lines 108 are opened to allow pressurized water to flow to the sprinkler devices attached thereto. In preferred embodiments, this output circuitry includes triac based switches, but may include any known switching mechanisms known to such controllers, or other decoder switch modulators.

Figure 2:
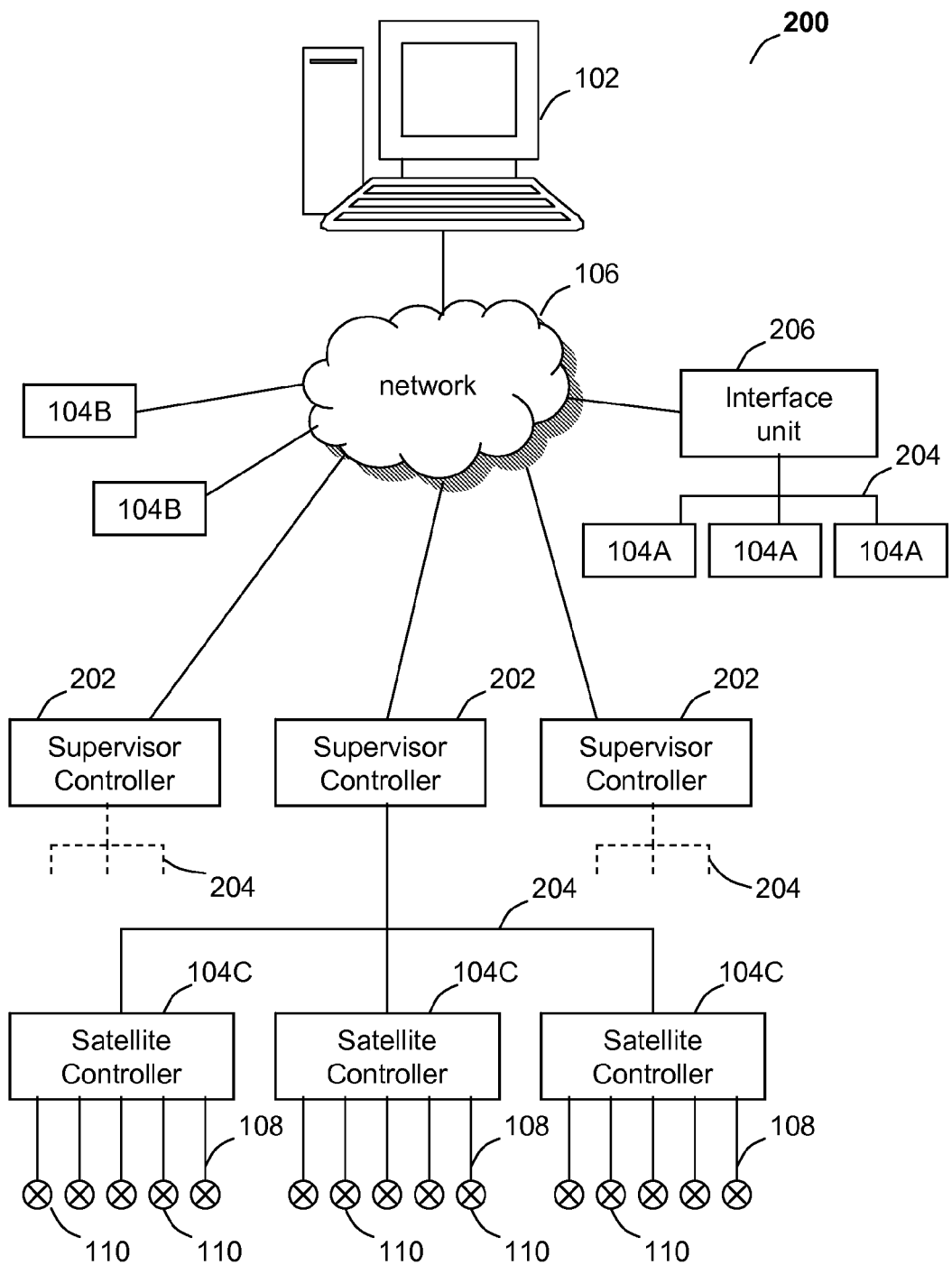
FIG. 2 is a diagram of another central control based irrigation control system according to some embodiments.

Referring next to FIG. 2, a diagram is shown of another central control based irrigation control system 200 according to some embodiments. In this system, the central controller 102 generates and manages watering programs and schedules for a system including remotely located supervisor controllers 202 (which may also be generically referred to as irrigation control units) and remotely located satellite controllers 104. In one scenario, the central controller 102 communicates directly with satellite controllers 104B via the network 106. In this way, the central controller 102 directly controls the satellite controllers 104B, either by generating and sending ON/OFF control signals or by sending watering schedules to the satellite controllers 104B. In another scenario, the central controller 102 communicates with multiple satellite controllers 104A via the network 106 and an interface unit 206. In this way, the central controller 102 controls multiple satellite controllers 104A via the interface unit 206, either by generating and sending ON/Off control signals or by sending watering schedules to the satellite controllers 104A via the interface unit 206. In a further scenario, the central controller 102 communicates with the supervisor controllers 202 via the network 106, and the supervisor controllers 202 are each coupled to respective satellite controllers 104C via network 204 (which is illustrated as a wireline network). It is understood that in all scenarios, the network 204 can be any wired and/or wireless network of connections, from as simple as a point to point wireline connection between the respective controllers, to interconnected bus structures to connections spanning multiple different types of wired and/or wireless connections. The central controller 102 controls the supervisor controllers 202, each of which in turn controls one or more satellite controllers 104C. It is noted that for simplicity, only one supervisor controller 202 is illustrated with satellite controllers 104C coupled thereto; however, it is understood that each supervisor controller 202 directly controls one or more satellite controllers 104. It is further noted that the separate reference numbers of satellite controllers 104A, 104B and 104C are provided merely to show various connections to the central controller and that when referring to satellite controller 104, any one of satellite controllers 104, 104A, 104B and 104C is intended. Depending on the system, implements, the satellite controllers 104, 104A, 104B and 104C may be the same or different than each other.

In this system 200, the supervisor controllers 202 function like "area controllers" that control a number of satellite controllers 104C in a defined geographical region. The supervisor controllers 202 are responsible for the irrigation occurring within their geographic regions and are capable of making adjustments to watering schedules specific to the needs of the regions they control. For example, environmental information received from satellite controllers 104C to a given supervisor controller 202 may be used by the supervisor controller 202 to adjust watering schedules for one or more of its satellite controllers 104C. At the next opportunity to communicate with the central controller 102, the supervisor controller 202 informs the central controller 102 of the changes made. The central controller 102 manages the entire system 200 and generates scheduling and irrigation programs like in the system 100 of FIG. 1. It is noted that a given system may be variously configured such that the system includes one or more or all of the connection scenarios illustrated in FIG. 2.

It is noted that in both FIGS. 1 and 2, the control systems 100 and 200 have a predefined hierarchical control structure with different control layers, each control layer being superior to a control layer beneath that control layer. For example, in FIG. 1, the central controller 102 is in superior hierarchical control relationship with the satellite controllers 104. That is, the central controller 102 controls the satellite controllers 104, the satellite controllers do not control the central controller. In FIG. 2, the central controller 102 is in superior hierarchical control relationship with the supervisor controllers 202, which are in turn in a superior hierarchical control relationship with the satellite controllers 104C. That is, the central controller 102 controls the supervisor controllers 202 and the satellite controllers 104C, and the supervisor controllers 202 control the satellite controllers 104C. Furthermore, in FIG. 2, the central controller 102 is in superior hierarchical control relationship with the satellite controllers 104A and 104B. That is, the central controller 102 controls the satellite controllers 104A and 104B, the satellite controllers 104A and 104B do not control the central controller. It is understood that when one controller controls another controller, this control represents that hierarchical control structure. In some embodiments, such control is in real-time, while in other embodiments, such control is not in real-time.

Figure 3:
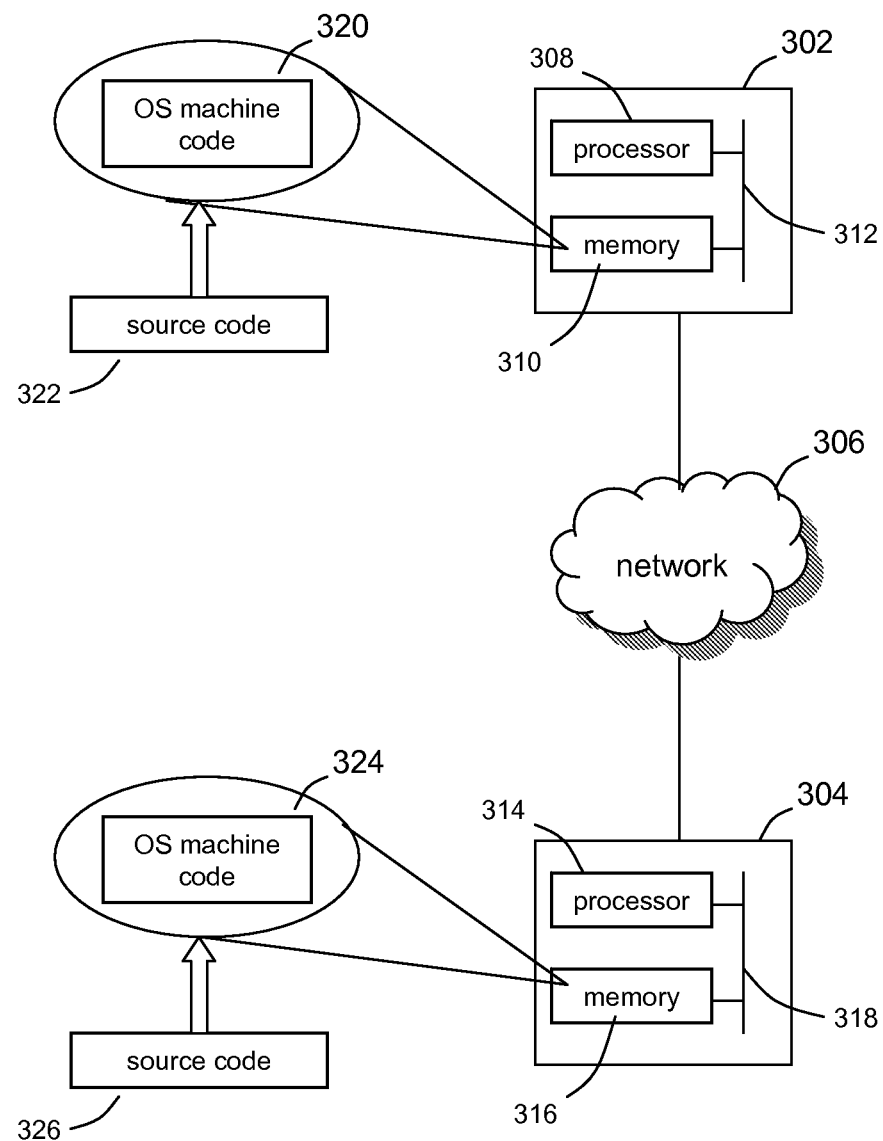
FIG. 3 is a diagram illustrating several embodiments of the invention in which irrigation controllers of different control layers of a hierarchical control structure share at least a portion of the same code base.

Referring next to FIG. 3, a diagram is shown to illustrate several embodiments of the invention in which irrigation controllers on different control layers of a hierarchical control structure share at least a portion of the same code base. In a hierarchical control structure, irrigation control unit 302 controls irrigation control unit 304. Thus, the irrigation control units 302 and 304 have a predefined hierarchical control relationship with respect to each other in that one controls the other. The irrigation control unit 302 is coupled to the irrigation control unit 304 via a network 306. Relative to the systems of FIGS. 1 and 2, the irrigation control units 302 and 304 can respectively correspond to: a central controller 102 and a satellite controller 104 (or satellite controllers 104A and 104B of FIG. 2); a central controller 102 and a supervisor controller 202; or a supervisor controller 202 and a satellite controller 104C. The network 306 can be any combination of wired or wireless communication links including all appropriate interfacing devices and equipment.

Generally, each of the irrigation control units 302 and 304 are computer devices including at least one processor (e.g., microprocessor or microcontroller) and at least one memory. That is, irrigation control unit 302 includes memory 310 and processor 308 coupled to each other via a bus 312, while irrigation control unit 304 includes memory 316 and processor 314 coupled to each other via bus 318. Even though only a single processor and memory are shown for each device, it is understood that depending on the complexity of the control unit, there may be multiple processors and multiple memory units. For example, in the case that the irrigation control unit 302 is a personal computer based central controller 102, it may include several processors, including a main microprocessor, a video microprocessor, etc., while the memory 310 can be made up of one or more of a hard drive, read only memory (ROM), random access memory (RAM), flash memory, removable memory, etc. One the other hand, in the case that irrigation control unit 304 is a typical satellite controller 104, it may include only one microprocessor while the memory 316 includes one or more of RAM, ROM, a hard drive, flash memory, removable memory, etc. Additionally, it is understood that although a single bus is shown in both control units, that this bus represents a bus structure of interconnections between the one or more processors and one or more memories.

Generally, machine code is stored in the memories 310 and 316, which when executed by the processors 308 and 314 provides the functionality of the irrigation control units 302 and 304. In the case of a general purpose computer device, such as a personal computer, this machine code can be referred to as software. A personal computer stores machine code that implements a general purpose operating system when executed and stores machine code that implements various applications when executed. For example, the operating system software of a personal computer can be MICROSOFT WINDOWS®, LINUX®, etc. The application machine code includes word processors, email programs, web browsers, games, etc. When a personal computer is used as a central controller 102 in an irrigation system, the personal computer stores and executes an irrigation central control application. Examples of such applications include CIRRUS® and MAXICOM2®, commercially available from the Rain Bird Corporation.

In the case of a specific purpose computer device, such as a typical satellite controller 104, that stores this machine code in the logic of a memory such as a read only memory (ROM), this machine code can be referred to as firmware. The firmware combines operating system machine code with application machine code.

Accordingly, the memory 310 of the irrigation control unit 302 stores machine code including operating system machine code 320. This operating system machine code 320 was derived from source code 322 written by programmers and in a form that is understandable to a human. According to well known processes, the source code is translated into machine code or binary code that is readable and executable by a machine or computer. For example, the source code 322 is compiled or otherwise interpreted into object code, which is then transformed into machine code, if not already in machine code. For example, compilers, linkers, assemblers or other interpreters are used to generate the machine code from the source code. The machine code, not the source code, is the code that is stored in the memory 310 of the computer. In this case, operating system source code 322 is translated into operating system machine code 320.

The memory 316 of irrigation control unit 304 stores machine code including operating system machine code 324. This operating system machine code 324 was similarly derived from source code 326 written by programmers and is in a form that is understandable to a human, as described above. According to several embodiments, the operating system machine code 320 and the operating system machine code 324 share the same code base. The code base of a computer program is generally referred to as the source code that implements the programs core functionality. In other words, both sets of operating system machine code are derived from at least a portion of the same source code. In preferred form, at least a portion of the source code 326 is identical to at least a portion of the source code 322. In preferred form, this results in the operating system machine code of both irrigation control units 302 and 304 being at least related to each other. However, since the source code 322 and the source code 326 are not completely identical, the resulting operating system machine code 320 and the operating system machine code 324 are not identical even though they share the same code base.

According to several embodiments, the operating system machine code 324 is considered a related operating system to that provided by the operating system machine code 320. For instance, the operating system machine code 324 represents a scaled down version of operating system machine code 320 that is specifically designed to be embedded in small, mobile computer devices. Examples of pairs of the operating system machine code 320 and the operating system machine code 324 include: MICROSOFT WINDOWS® and MICROSOFT WINDOWS CEO; MICROSOFT WINDOWS XP® and MICROSOFT WINDOWS XP Embedded®; LINUX® and LINUX Embedded®, etc.

Furthermore, in some embodiments, the operating system machine code 324 is the same operating system as that provided by the operating system machine code 320. For example, both irrigation control units 302 and 304 each have one of the following operating system machine codes including: MICROSOFT WINDOWS; MICROSOFT WINDOWS CE; MICROSOFT WINDOWS XP; MICROSOFT WINDOWS XP Embedded; LINUX; LINUX Embedded; etc.

Advantageously, since both irrigation control units 302 and 304 share at least a portion of the same source code, an application software/firmware program designer knows that both control units will respond or function similarly to the same instruction set implemented in an application program. In prior systems in which different code bases were used to develop machine code for irrigation control units, it is difficult to accurately execute or simulate the operation or functionality of one irrigation control unit within the other irrigation control unit. Thus, according to several embodiments, a program designer may create an application from a single set of source code that will easily execute on the operating system of either the irrigation control units 302 or 304. Traditionally, a program designer needed to separately develop software for one irrigation control unit and firmware for another irrigation control unit, leading to longer development time and cost and more on-going maintenance. It is noted that the embodiments of the invention described in connection with FIG. 3 may also be implemented in an irrigation control system that does not have a hierarchical control structure, e.g., a peer-to-peer control structure.

Figure 4:
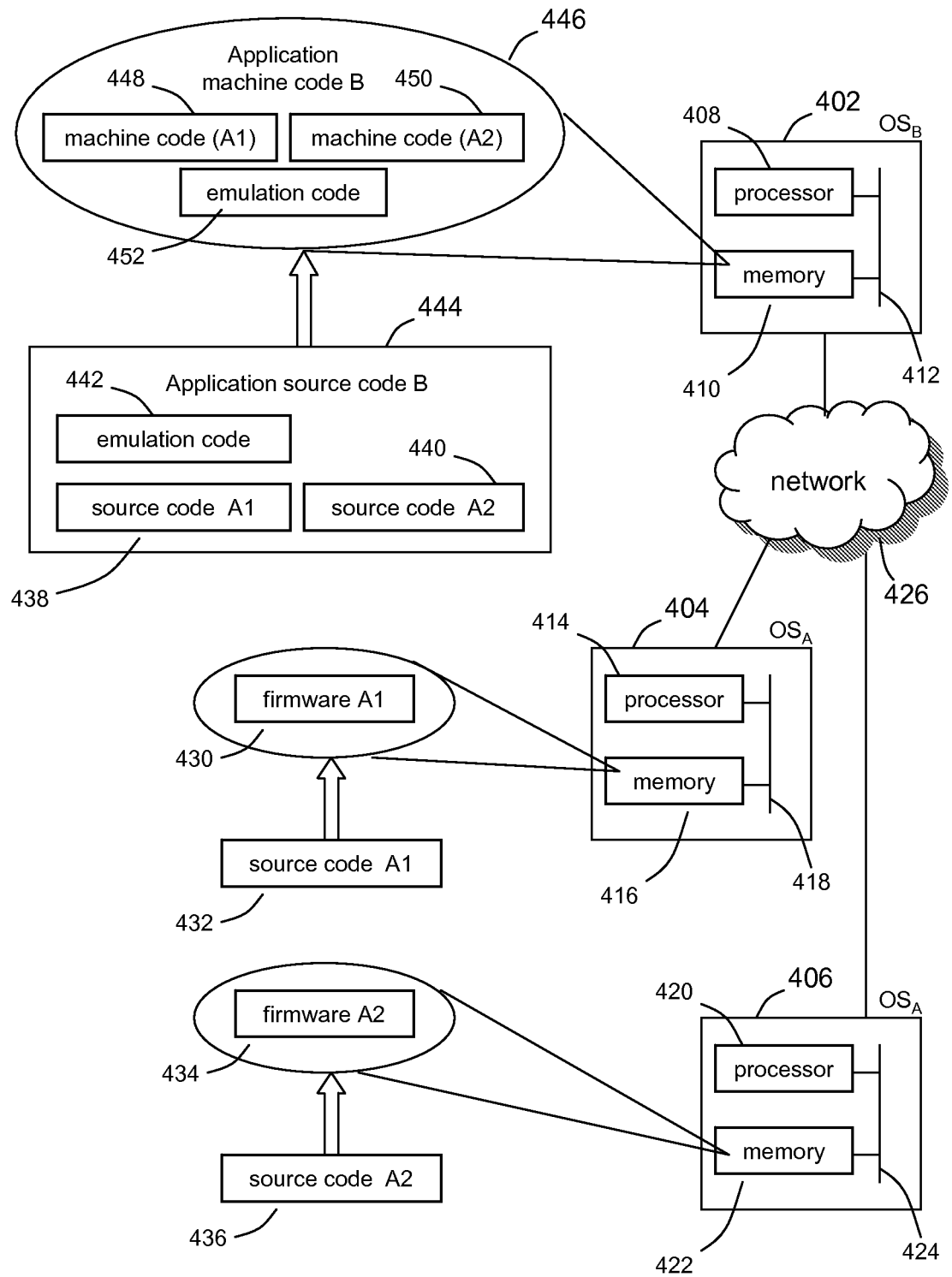
FIG. 4 is a diagram illustrating several further embodiments of the invention in which irrigation controllers of different control layers of a hierarchical control structure share at least a portion of the same code base.

Referring next to FIG. 4, a diagram is shown to illustrate several embodiments of the invention in which irrigation controllers on different control layers of a hierarchical control structure share at least a portion of the same code base. In a hierarchical control structure, irrigation control unit 402 controls both irrigation control unit 404 and irrigation control unit 406. Thus, irrigation control unit 402 and irrigation control unit 404 have a predefined hierarchical control relationship in that one controls the other. Similarly, irrigation control unit 402 and irrigation control unit 406 have a predefined hierarchical control relationship in that one controls the other. However, the irrigation control unit 404 and irrigation control unit 406 do not have a predefined hierarchical control relationship to each other.

Irrigation control unit 402 is coupled to remotely located irrigation control units 404 and 406 via a network 426. Relative to the systems of FIGS. 1 and 2, the irrigation control unit 402 and the irrigation control units 404 and 406 can respectively correspond to a central controller 102 and two satellite controllers 104 (e.g., any one of satellite controllers 104, 104A, 104B and 104C), a central controller 102 and two supervisor controllers 202, or a supervisor controller 202 and two satellite controllers 104. The network 426 can be any combination of wired or wireless communication links including all appropriate interfacing devices and equipment.

Generally, each of the irrigation control units 402, 404 and 406 are computer devices including at least one processor (e.g., microprocessor or microcontroller) and at least one memory. That is, irrigation control unit 402 includes memory 410 and processor 408 coupled to each other via a bus 412, while irrigation control unit 404 includes memory 416 and processor 414 coupled to each other via bus 418, and irrigation control unit 406 includes memory 422 and processor 420 coupled to each other via bus 424. Even though only a single processor and memory are shown for each device, it is understood that depending on the complexity of the control unit, there may be multiple processors and multiple memory units. For example, in the case that the irrigation control unit 402 is a personal computer based central controller 102, it may include several processors, including a main microprocessor, a video microprocessor, etc., while the memory 410 can be made up one or more of a hard drive, ROM, RAM, flash memory, removable memory, etc. One the other hand, in the case that the irrigation control units 404 and 406 is are typical satellite controllers 104, they may include only one microprocessor while the memory 410 includes one or more of RAM, ROM, a hard drive, flash memory, removable memory, etc. Additionally, it is understood that although a single bus is shown in both control units, that this bus represents a bus structure of interconnections between one or more processors and one or more memories.

Generally, executable machine code is stored in the memories 410, 416 and 422, which when executed by the processors 408, 414 and 420 provides the functionality of the irrigation control units 402, 404 and 406. It is noted that machine code is understood to be a set of instructions that are executable by a processor to accomplish functionality. In the case of a general purpose computer device, such as a personal computer, this machine code is referred to as software. As described above, this general purpose computer device stores machine code that implements a general purpose operating system when executed and stores executable machine code that implements various applications when executed. In the case of a specific purpose computer device that stores this machine code in the logic of a memory such as a read only memory (ROM), this executable machine code is referred to as firmware. The firmware combines operating system machine code with application specific machine code. Generally, this machine code can be thought of as a set of instructions that when executed by a processor perform one or more functions.

According to several embodiments of the invention, machine code is developed for and stored in the memory 410 of irrigation control unit 402 that is based on the same source code upon which machine code stored in the memories 416 and 422 of one or both of the irrigation control units 404 and 406 is also based. Thus, at least a portion of the machine code in irrigation control unit 402 shares the same code base as at least portion of the machine code of irrigation control units 404 and 406. This machine code is executed in the irrigation control unit 402 to execute or simulate the same functionality executed in the irrigation control units 404 and 406. In preferred form, the operating system machine code of irrigation control unit 402 is different than that stored in irrigation control units 404 and 406. In other words, the operating system or environment of irrigation control unit 402 is different than the operating system or environment of both irrigation control units 404 and 406. This is illustrated in FIG. 4 as $OS_A$ and $OS_B$. By developing machine code for irrigation control unit 402 from at least a portion of the same source code that was previously used in the prior development of machine code for the irrigation control units 404 and 406 lower in the hierarchical control structure than irrigation control unit 402, the software developer does not need to rewrite source code for irrigation control unit 402, leading to faster software application development time and lower costs. In other words, the machine code for irrigation control unit 402 is separately developed after the development of the machine code for irrigation control units 404 and 406, but re-using at least a portion of the previously developed source code. It is also understood that in some embodiments, when re-using developed source code to develop source code that will become a portion of the machine code for irrigation control unit 402, the machine code for irrigation control unit 402 is developed at the same time as the machine code for irrigation control units 404 and 406, or developed prior to completion of the machine code for irrigation control units 404 and 406.

One particular application for which this technique is beneficial involves designing executable machine code to be used in irrigation control unit 402 in order to execute one or more functions of one or both of irrigation control units 404 and 406 within the operating system or environment of irrigation control unit 402. This execution may be for purposes of executing and implementing one or more functions in the irrigation control unit 402 instead or in addition to the execution and implementation of the function/s at or by the irrigation control units 404 and 406. In such case, the executable machine code at irrigation control unit 402 outputs the proper signaling to cause the executed function of the machine code to be implemented. For example, if the irrigation control unit 402 functions as the central controller 102 and directly controls a given satellite controller (e.g., satellite controller 104B) and the executable machine code of irrigation control unit 402 is based on the same source code as the irrigation engine of irrigation control unit 404 or 406, then the irrigation control unit 402 would execute the machine code (irrigation engine) and output signaling to the satellite controller 104B to start/stop watering.

In other embodiments, the executable machine code in irrigation control unit 402 executes one or more functions of one or both of irrigation control units 404 and 406 within the operating system or environment of irrigation control unit 402 in order to simulate the function/s of irrigation control units 404 and 406 to model and analyze their behavior. For example, when irrigation control unit 402 is configured as a central irrigation controller 102 running a central irrigation control application software, it is beneficial for a manager to perform a simulation or dry run of the effect of watering schedule changes on the operation of the components of the system. Such dry run features provide a prediction of how its remotely located satellite controllers (e.g., irrigation control units 404, 406) will operate (e.g., when stations will turn on and off, how much flow will occur, etc.) in the past, present, and future. System managers rely on this dry run information to verify the appropriateness of their programming. In response to the results of a dry run, the manager may decide to alter the programming for a variety of reasons, such as to shorten the watering window or reduce hydraulic demand. Many times, central irrigation control systems are so large and complex that it is nearly impossible for a manager to understand the net results of the programming without a dry run feature. Other related simulations may be for purposes of simulating and analyzing water pressure and/or flow characteristics and energy usage given the user programmed watering schedules across the system. In such a way, a system manager may identify and alter scheduling that would result in poor water pressure, flow or excessive energy used to operate components (pumps, satellite controllers, etc.).

Known central control applications including a dry run or simulation feature are developed from source code that is intended to emulate the operations of a generic irrigation control unit by way of "disparate software emulation". In this context, disparate software emulation can be viewed as a software emulation technique in which the operation of the irrigation control unit is modeled without using the same source code that defines the actual operations of the irrigation control unit. Examples of disparate software emulation range from very simplistic start time and run time calculation routines to relatively sophisticated routines that attempt to more thoroughly simulate the business rules of the remote irrigation control unit. Examples of business rules include: how many stations are permitted to operate simultaneously; how many and which programs are permitted to operate simultaneously or are required to be stacked; precedence rules that determine which program has priority over another; all rules associated with starting, stopping, pausing, suspending, or resuming operation of a station or program given a defined program type (odd, even, cyclical, custom day assignment, etc.) and under a multitude of conditions such as cycle/soak, event day off, station delay, and so forth. Disparate software emulation inherently results in inaccuracies for several reasons. First, the emulation code designed for the central controller is different than the actual code governing the operation of the remote satellite controllers, which means that there is a possibility that the results of the two different sets of code will be different. Second, as various revisions of the satellite irrigation controller are produced and sold, it becomes increasingly difficult for the developer to maintain the emulation code such that it accurately predicts the behavior of a new satellite irrigation control unit. Third, as various revisions of the satellite controller (with various version of firmware or machine code) are produced and sold, it becomes increasingly difficult for the software developer to make the emulation code such that it accurately predicts the behavior of all of the various satellite controller revisions that have been sold into the marketplace. These issues result in inaccuracies in the dry run predictions, which result in the presentation of erroneous data to the end user. Thus, the irrigation manager does not get an accurate simulation and may make decisions in modifying watering programs that do not produce the intended results.

According to several embodiments, the developer of the executable machine code for irrigation control unit 402 (which in preferred form is implemented as a central controller 102) obtains a copy of at least a portion of the source code which forms the basis of the machine code stored in irrigation control units 404 and 406 (which in preferred form are implemented as satellite controllers 104), and uses at least a portion of that source code in the development of machine code for an application to be used in irrigation control unit 402. This application machine code is executed in irrigation control unit, for example, to execute or implement a function/s of irrigation control units 404 and/or 406 or simulates a function/s of irrigation control units 404 an/or 406. In the preferred form of performing a simulation or dry run of the functionality of irrigation control units 404 and 406 in response to specific watering parameters, irrigation control unit 402 executes code that functions identically or nearly identically to at least a portion of machine code of irrigation control units 404 and 406. Advantageously, emulation code to model the behavior of irrigation control units 404 and 406 does not need to be created from the ground up—the source code that was previously used to develop the machine code for the irrigation control units 404 and 406 is reused. In preferred form, the resulting simulations performed in irrigation control unit 402 exactly or nearly exactly correspond to the actual results of the operation of irrigation control units 404 and 406 under nominal operating conditions with no real-time events that could change the nominal operation of the irrigation control units 404 and 406, such as rain, broken pipes, leaks, wind, wiring faults, etc. In other words, the simulation of the nominal behavior of irrigation control units 404 and 406 within the operating system of irrigation control unit 402 is extremely accurate and will provide a system manager with accurate results upon which decisions can be made. Furthermore, in preferred form, the machine code for the application in irrigation control unit 402 may be based on at least a portion of the source code for different models of irrigation control units 404 and 406 and/or different firmware versions of irrigation control units 404 and 406. The functionality of the machine code at irrigation control unit 402 is configured to be executed (e.g., to implement or simulate an irrigation function) on a per irrigation control unit basis using the appropriate machine code developed from source code corresponding to each particular irrigation control unit 404 and 406. Again, the application software developer is not required to develop and maintain a separate set of emulation code on a per irrigation control unit basis, nor is required to develop or make revisions to this emulation code each time a revision is made to the firmware of a remote irrigation control unit. It is noted that in some instances, emulation code is not required if the source code that forms the basis of the machine code of irrigation control units 404 and/or 406 is written so that it can interface with the operating environment of both irrigation control units 404/406 and irrigation control unit 402.

It is noted that although generally only two remote irrigation control units (i.e., irrigation control units 404 and 406) are illustrated in FIGS. 1 and 2, in reality, a central control irrigation control system may have tens or hundreds of remote irrigation control units. The principles of these embodiments apply to both large-scale systems and small-scale systems.

Referring back to FIG. 4, the memory 416 of irrigation control unit 404 stores executable machine code 430 that defines its operating system and the functionality. Similarly, the memory 422 of irrigation control unit 406 stores machine code 434 that defines its operating system and the functionality. Machine codes 430 and 434 are derived from source codes 432 and 436, respectively, which were written by programmers in a form that is understandable to a human. According to well known processes, the source code 432 and 436 is translated into executable machine code or binary code that is readable and executable by a machine or computer. For example, the source code 432 and 436 is compiled or otherwise interpreted into object code, which is then transformed into machine code 430 and 434, if not already in machine code. The machine code, not the source code, is the code that is stored in the memories 416 and 422 of irrigation control units 404 and 406. In the case that irrigation control units 404 and 406 are standard satellite controllers 104, this machine code 430 and 434 is stored in ROM and is referred to as firmware. It is noted that machine code 430 may be different than machine code 434 in some embodiments, for example, where irrigation control units 404 and 406 are different models or different versions of the same model.

When a programmer attempts to design a software application for irrigation control unit 402, rather than developing emulation code from the ground up, the programmer obtains a copy of at least a portion of the previously developed source code 432 and the source code 436. This copy of the source code is ported into the programming development environment of the operating system of irrigation control unit 402. For example, in developing a software application for an operating system of a general purpose computer device, such as a personal computer or server, at least a portion of the source code 432 and 436 is ported into the development environment of that operating system. In the case that irrigation control unit 402 is a personal computer having a MICROSOFT WINDOWS operating system, at least a portion of the source code 432 and 436 is ported into a WINDOWS software development environment. In. FIG. 4, the ported source code is illustrated as source code 438 and source code 440. In preferred form, not all of source code 432 and 436 is copied, only the relevant portions needed to accomplish the desired functions. Once the source code is ported into the development environment, interfacing emulation code 442 is used to allow the ported source code 438, 440 to appropriately interact with the instruction set native to the operating system of irrigation control unit 402. It is understood that the emulation code may be obtained, developed, purchased, etc. However, it is noted that in some cases, emulation code 442 is not required if the source code 438 and 440 is originally written to be compatible with the operating system of irrigation control unit 402 (as well as units 404 and 406). Once the entire application source code 444 is created in the development environment, the application source code 444 is transformed into application executable machine code 446 according to known processes. This application machine code 446 includes machine code corresponding to the ported source code and emulation machine code 452 corresponding to the emulation source code 442. In the illustrated embodiment, machine code 448 corresponds to ported source code 438, and machine code 450 corresponds to ported source code 440. It is noted that in embodiments not requiring emulation code, the executable application machine code 446 does not include emulation machine code 452. Once in machine code form, the application machine code 446 is transferred to, downloaded into, cached in, and/or installed in, the memory 410 of the irrigation control unit 402.

Accordingly, irrigation control unit 402 stores executable machine code 446 that includes machine code (such as machine code 448 and 450) that is based on at least a portion of source code (such as source code 438 and 440) for which machine code (such as machine code or firmware 430 and 434) is also based. Thus, generically, a portion of the machine code of irrigation control unit 402 shares the same code base as at least a portion of the machine code of irrigation control units 404 and 406. In preferred form, at least a portion of the application source code 444 is identical to at least a portion of the source code 432 and 436. It is important to note that at least a portion of the source code ported into the development environment for the operating system of irrigation control unit 402 comprises enough source code to perform an irrigation control function when executed. For example, the irrigation function may include functions such as turning a station on, turning a station off, suspending irrigation, resuming irrigation, causing an irrigation parameter to be displayed, calculating a metric related to received weather data, causing irrigation parameters to be transmitted to a higher level control unit, etc. In some instances, all of the source code which is used to develop the machine code for a particular irrigation control unit is ported into the development environment, whereas in other instances, only a portion of that source code that is designed to perform an irrigation control function is ported into the development environment. In preferred form, where the irrigation engine of irrigation control units 404 and 406 is to be executed in irrigation control unit 402 to implement or simulate one or more functions of the irrigation engine within the operating system or environment of irrigation control unit 402, source code implementing the "irrigation engine" of irrigation control units 404 and 406 is copied and ported into the development environment. The irrigation engine is understood to be the programming that defines the behavior of the irrigation control unit in response to watering program information.

It is noted that in many embodiments, the machine code created for execution in irrigation control unit 402 is not identical to the corresponding machine code of the other irrigation control units 404 and 406. For example, machine code 448 is not identical to firmware or machine code 430, even though both are based on at least a portion of the same source code 432. Similarly, machine code 450 is not identical to firmware or machine code 434, even though both are based on at least a portion of the same source code 436. This is due to the fact that in transforming the source code into machine code, different transformation tools are used in the different development environments since ultimately the operating environment of irrigation control unit 402 is different than the operating environment of irrigation control units 404 and 406. For example, different compilers, linkers, assemblers, interpreters, etc. are used in the different development environments. However, since both sets of machine code are based on at least a portion of the same source code, both sets of machine code should behave identically. This is particularly advantageous where irrigation control unit 402 seeks to execute a function of one or both of irrigation control units 404 and 406 to implement that function or simulate that function in irrigation control unit 402.

In many embodiments, it is noted that the development of application software for irrigation control unit 402 occurs at a point in time after the source code and corresponding machine code for a particular remote irrigation control unit (such as irrigation control units 404 and 406) has already been developed and is in use. That is, the source code and machine code for each remote irrigation control unit has already been developed and already exists, and the application software developer seeks to reuse at least a portion of that already created source code rather than develop new source code to emulate the already existing source code from the ground up. In other embodiments, the development of application software for irrigation control unit 402 occurs at the same time as the development of the corresponding machine code for a particular remote irrigation control unit. That is, the developer of the application software obtains a copy of the source code forming the basis of the machine code 430 and 436 to develop the application source code 444 and application machine code 446 in parallel with the development of the machine code 430 and/or 434 from that same source code. In other embodiments, the application machine code 446 may be developed prior to the completion of the development of a given set of machine code 430 and 434.

When the processor 408 of irrigation control unit 402 executes the application machine code 446 stored in the memory 410, the emulation machine code 452 acts as an interface between the application machine code 446 and operating system machine code (not shown) and the machine code 448 and 450 based on source code written for another operating system. Thus, the emulation machine code 452 emulates the operating system within which machine code 448 and 450 was intended to run from the perspective of the machine code 448 and 450 within the operating system of irrigation control unit 402. In other words, the machine code 448 and 450 executes instructions as if it were operating within the operating system of irrigation control units 404 and 406. The emulation machine code 452 processes the commands and inputs information into the machine code 448 and 450, and translates any outputs into a format compatible with the rest of the application machine code designed in accordance with the operating system of irrigation control unit 402. In other embodiments, emulation code is not required where the source code copied is written to be compatible with the operating systems of both irrigation control unit 402 and irrigation control units 404/406. Typically, all functions written in the copied source code would be written in a format understood by the operating system of irrigation control unit 402.

In the preferred embodiments, the application machine code 446 includes many different machine code versions (only machine codes 448 and 450 being illustrated), each version corresponding to machine code running in a different version and/or model of the irrigation control units. The application machine code 446 retrieves the proper version of machine code (either 448 or 450) from memory 410 based on the parameters of the functionality to be executed, e.g., in performing a simulation. For example, in a simple case where it is desired to simulate the effect of watering on the system when watering at both irrigation control units 404 and 406 (each having different firmware versions) is to be extended five minutes per day, the application software machine code 446 retrieves and executes the proper machine code version for each irrigation control unit 404 and 406 to provide the most accurate results. In preferred form, the user will either have programmed what firmware version a particular irrigation control unit is operating with or this information can be transmitted from irrigation control units 404, 406 to irrigation control unit 402 upon setup or automated request. In this way, the simulation feature accounts for differing operating systems amongst remote irrigation control units as well as different firmware or machine code versions operating within similar model remote irrigation control units. It is noted that the simulations performed in the irrigation control unit 402 may be irrigation watering program simulations to help a manager see how changes in scheduling will actually be implemented system wide, simulations of the user display or other functionality of the irrigation control units 404, 406 for quality assurance purposes, simulations of power and/or energy usage or water flow and/or pressure characteristics, etc. It is also noted that the embodiments of the invention described in connection with FIG. 4 may also be implemented in an irrigation control system that does not have a hierarchical control structure, e.g., a peer-to-peer control structure. It is also noted that any function may be actually executed and implemented by irrigation control unit 402. That is, the function is executed in order to implement the function in irrigation control unit 402, not just to simulate it. In this way, irrigation control unit 402 can function at least nearly identically to one or both of irrigation control units 404 and 406.

Figure 5:
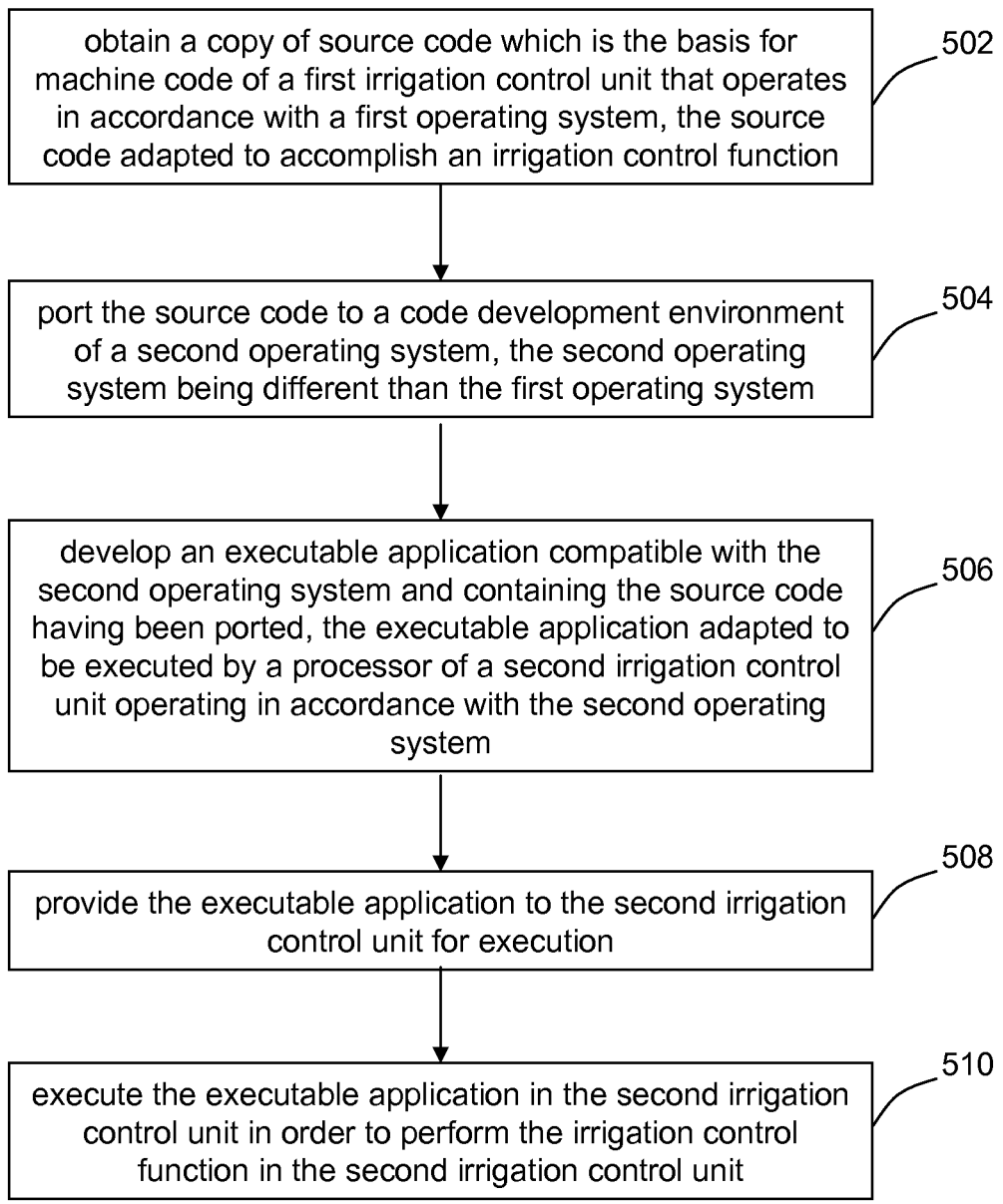
FIG. 5 is a flowchart illustrating steps performed in the development and running of an executable application for an upper control layer irrigation control unit in several embodiments of the invention.

Referring next to FIG. 5, a flowchart is shown illustrating steps performed in the development and running of an executable application according to several embodiments of the invention. Generally, this method provides for a way to implement an accurate execution of an irrigation control function of one irrigation control unit in another irrigation control unit, for example, to implement the control function or to simulate the control function. For example, in a central control irrigation system, features of some central irrigation control applications allow a central controller to emulate functionality of one or more remote irrigation control units, such as a supervisor controller or a satellite controller. Since the central controller 102 is implemented in an irrigation control unit 402 operating according to a different operating system (although in some embodiments, the operating systems are the same or related) than the remote irrigation controllers 104, and since the functionality of the remote irrigation controllers has already been translated into machine code at the time the central irrigation control application is to be developed, it is desirable to re-use the same code base for which the machine code of the remote irrigation controllers is based. Thus, according to several embodiments, a copy of source code which is the basis for machine code of an irrigation control unit that operates in accordance with a first operating system is obtained, this source code adapted to accomplish an irrigation control function (Step 502). For example, a copy of the relevant portion of the source code specific to a given irrigation control unit whose functionality is to be simulated is copied from a source code safe. It is noted that copies of different versions of source code corresponding to different firmware or machine code versions of a given irrigation control unit may be obtained, as well as for different models of irrigation control units. The portion of the source code obtained depends on the function to be executed. For example, in the system seeking to execute the operation of an irrigation control unit for execution of the watering schedules or for simulation purposes such as a dry run, the portion of the source code comprising the irrigation engine is obtained. In preferred form, the source code to be ported was originally created such that all business rules associated with stations, programs, and the controller (i.e., the irrigation engine) is well contained so that it can easily be ported. If the portion to be executed is the user interface or display for troubleshooting purposes, the portion of the source code governing and generating user displays responsive to certain inputs and state changes is obtained. It is also noted that rather than simply obtaining a copy of a portion of the source code, a copy of the entire source code governing the entire operation of a particular irrigation control unit may be obtained. In a preferred embodiment, the portion of the source code comprising the irrigation engine is obtained. In one example, this source code is written in the programming language C, which is transformed into machine code or firmware design to run on an AVR® operating system. The AVR® operating system is a real-time operating system developed by and commercially available from the Atmel Corporation for flash microcontrollers having an 8-bit RISC (reduced instruction set computer) core.

Next, the obtained portion of the source code is ported to a code development environment of a second operating system, the second operating system being different than the first operating system (Step 504). In other embodiments, such as described in FIG. 9, the second operating system is the same as the first operating system. To port a program or code is generally understood to be the process of moving the program or code from one type of computer or application to another. In other words, generically in accordance with several embodiments, porting is the process of adapting the source code to interface with a different operating system or different application. For example, to port the source code to the new development environment, the programmer must account for all hardware level specific calls of the source code. That is, the copied source code will contain instructions or functions that are specific to its native operating system. In the case of an irrigation engine, the source code calls these specific functions in order to get the clock time, etc., these specific functions not necessarily provided in the available function calls of the different operating system. Thus, additional emulation source code is used to emulate the operating system that the ported source code was written for in order to translate all inputs and outputs between the original source code and the acceptable functions and instructions in the different operating system. This emulation code can be obtained, developed or purchased, etc. Additionally, if source code to be ported utilizes functions that are built into the compiler used for that source code, those compiler functions are also ported or otherwise emulated. It is noted that in some embodiments, the ported source code is already written to account for hardware level specific calls of the different operating system and thus, emulation source code is not required. Furthermore, in some cases, the porting process includes modifying the source code to add new functions that are needed in the different operating system for a particular application. For example, in one variation where the machine code will eventually be used for simulation purposes, the ported source code is modified to save outputs to a memory array after each clock tick, which is useful for dry run simulations. In other embodiments where the machine code is used to implement a function in the different operating system, the ported source code may be modified to output signaling to implement the function, e.g., output signaling to cause watering, as opposed to or in addition to simply saving outputs for analysis. Furthermore, in preferred form, the programmer ensures that the ported source code is "thread safe". In other words, the programmer ensures that if the ported source code is designed to run several process threads simultaneously, that this is accounted for when creating emulation code to port the source code into the different development environment. Additionally, the ported source code may include multiple versions of the source code, each corresponding to a particular firmware version of an irrigation control unit. In a specific embodiment, source code comprising the irrigation engine developed for the AVR operating system is obtained and ported into a MICROSOFT WINDOWS (e.g., WINDOWS XP) development environment to develop an application that will execute in the WINDOWS operating system. For example, as shown in FIG. 4, the ported source code is shown as source code 438 and source code 440. The emulation code 442 is used to interface the ported source code 438 and 440 to the application source code 444.

As a general procedure, in order to port source code from one operating system to another operating system, a set of source code is copied or imported into the development environment of the new operating system. Then the developer attempts to build the source code in the new development environment, which will typically result in errors. These errors are used to determine what additional code needs to be written in order for the source code to be fully ported. For example, if the source code wants to call function "f" and this function is not supported in the new operating system, emulation code needs to be written to implement or provide an interface for this function using one or more functions available in the development environment. Once all of these missing pieces of emulation code are written (if needed), the developer then builds the code and tests it to see if it will successfully work in the new operating system. Testing the code may reveal further areas that will require further emulation code. Eventually the source code together with the emulation code will work correctly in the new operating system; thus, the source code is ported. Alternatively, emulation code may be used that works specifically with source code developed for the operating system of the remote irrigation control units. This emulation code may be obtained, copied, purchased or developed. For example, AVR emulation source code produced by the Atmel Corporation can be purchased which is designed to allow source code designed for the AVR operating system used in satellite controllers of some embodiments to work in a WINDOWS operating system.

Then, an executable application compatible with the second operating system and containing the source code having been ported is developed, the executable application adapted to be executed by a processor of a second irrigation control unit operating in accordance with the second operating system (Step 506). In preferred embodiments, the second irrigation control unit is either a supervisor controller 202 or a central controller 102. Step 506 involves the writing, developing or building of the source code for the application (e.g., application source code 444) itself and all necessary source code that interacts (e.g., emulation code 442) with the ported source code (e.g., source code 438 and 440). The application source code may be created in any desired language. Step 506 also includes any steps involved in transforming the source code into executable machine code. These step(s) include translating the source code into object code and then into machine code and includes assembling, compiling, interpreting and/or linking to generate the executable application including executable machine code. In preferred form, the application source is created using the programming language C or a variation thereof. It is noted that Step 506 may be performed at least partially concurrent with Step 504.

Once the executable application is developed, this executable application is provided to the second irrigation control unit for execution (Step 508). The executable application or program may be provided in a variety of ways. For example, the application may be stored on a computer readable medium, such as a compact disc (CD), digital video disc (DVD), flash memory, USB drive, a server, etc. and copied or downloaded into the second irrigation control unit. In preferred embodiments, the application is copied and installed in the computer readable medium or memory 410 (e.g., a hard drive, ROM, RAM, flash memory, etc.) of the irrigation control unit 402. In some embodiments, the application is stored in a server such that the second irrigation control unit may download the application via a computer network. In another embodiment, the executable application is stored on a remote server coupled to the second irrigation control unit via a computer network and available for execution by the remote server upon request by the second irrigation control unit. This case, the remote server functions as an application server.

Next, the executable application is executed in the second irrigation control unit in order to perform the irrigation control function in the second irrigation control unit (Step 510). This is usually triggered by a user via input through a graphical user interface and other inputs, such as a keyboard and mouse. In executing the application, the application retrieves from memory the proper version of the machine code that corresponds to each remote irrigation control unit to be simulated. This machine code is executed by emulating the native operating system of the machine code of the remote irrigation control unit (e.g., supervisor controller or satellite controller) within the operating system of the irrigation control unit functioning as the central irrigation controller or a supervisor controller. In a specific embodiment, the application executes machine code based on source code that was written for the AVR operating system of a remote irrigation controller within a MICROSOFT WINDOWS operating system of a personal computer functioning as a central irrigation controller. The application emulates at least a portion of the AVR operating system from the perspective of the machine code such that the machine code will behave exactly as it does in its native operating system.

In other embodiments, this machine code is executed per Step 510 without requiring the emulation of the native operating system of the machine code of the remote irrigation control unit within the operating system of the irrigation control unit functioning as the central irrigation controller or a supervisor controller. In this embodiment, the ported source code was originally written such that emulation would not be required. That is, all hardware level specific calls are in a format compatible with the operating system of the second irrigation control unit.

In some embodiments, the execution of the application performs the irrigation control function in the second irrigation control unit in order that the second irrigation control unit execute or implement the irrigation control function in addition to or instead of the first irrigation control unit. In such case, the executable application includes the functionality to output signaling to cause or implement the result of the irrigation control function. In other embodiments, the execution of the application performs the irrigation control function in the second irrigation control unit in order to simulate the irrigation control function in the second irrigation control unit. In such case, the executable application includes the functionality to save variables and settings and operation results of the execution for analysis purposes.

Figure 6:
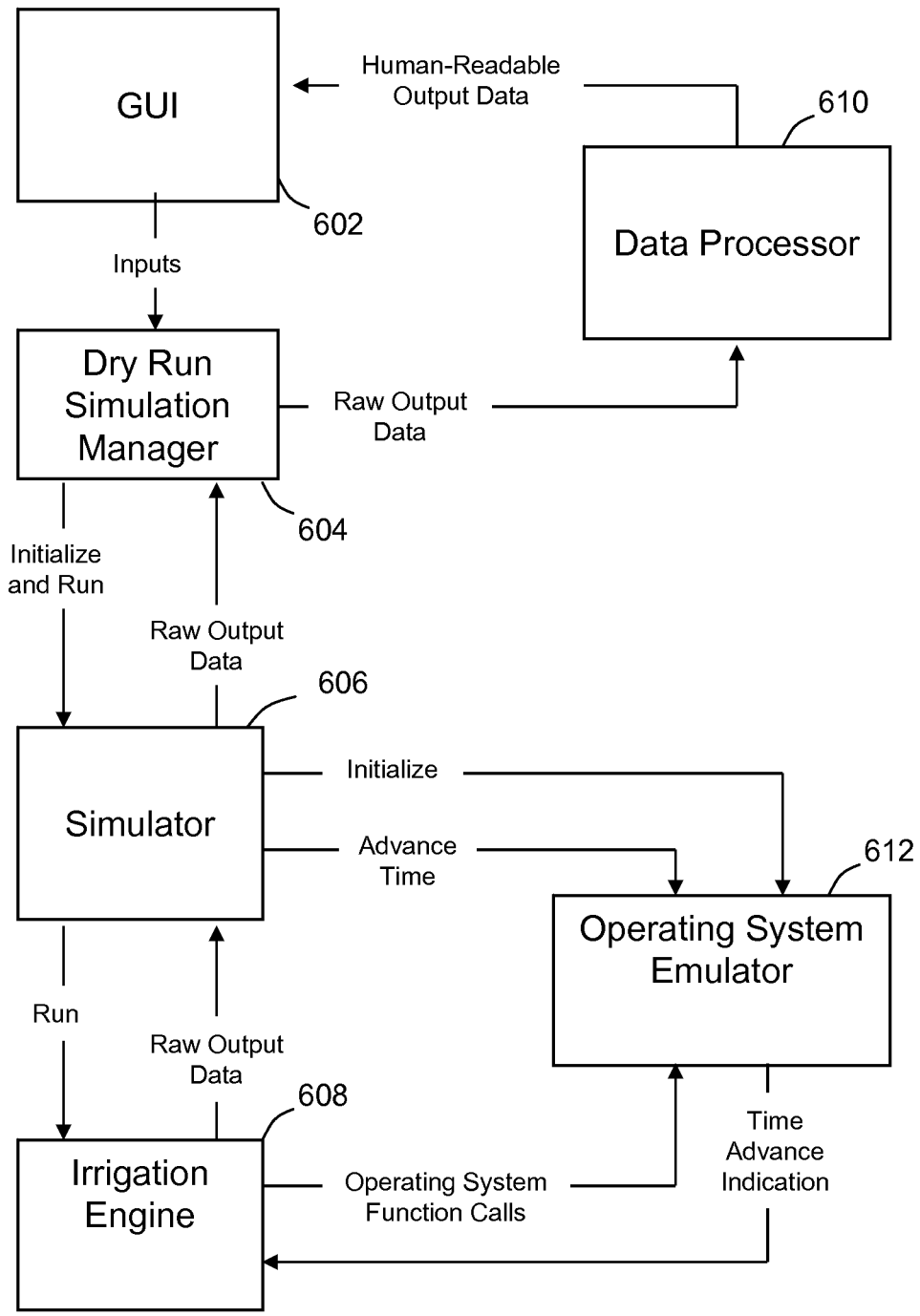
FIG. 6 is a functional block diagram of the data flow of a dry run simulation executed at an irrigation control unit functioning as a central irrigation controller in accordance with several embodiments.

Referring next to FIG. 6, a block diagram is shown of the functional components of a dry run simulation portion of an application executed at an irrigation control unit functioning as a central controller in accordance with several embodiments. That is, the functionality of one or more remote irrigation control units is executed in order to simulate the functionality for analysis purposes. Illustrated are a graphical user interface (GUI) 602, a dry run simulation manager 604, a simulator 606, an irrigation engine 608, a data processor 610, and an operating system emulator 612.

Generally, the user interacts with the application via the GUI 602, which provides for user inputs via a keyboard and mouse, etc., and provides instructions to generate appropriate screen displays. The user inputs all the information requested by the application, which is received by and coordinated by the dry run simulation manager 604. Other information may be received including the type of irrigation control units that are controlled by the central controller and the firmware versions of the machine code running on these irrigation control units. In preferred form, source code that defines the irrigation engine of these remote irrigation control units should have a defined interface that is capable of being accessed by the central controller. For example, the interface is capable of either accepting inputs or seeking inputs that fully define all of the controllers programming (such as a program types, station run times, start times, adjustment values, event day off, delay values, etc.) and provide the corresponding outputs (precisely when each station turns on and off) that define the controller's operation given the inputs. Furthermore, each remote irrigation controller is preferably capable of storing information related to its firmware version and reporting this information to the central controller upon request (either by the user or the central control application). The user initiates the simulation via the GUI 602, which causes the dry run simulation manager 604 to initialize and to send commands to the simulator 606. The simulator 606 provides all instructions and function calls to run the simulation. The simulator 606 initializes the operating system emulator 612. The proper machine code or firmware version corresponding to the specific irrigation control units to be simulated is/are retrieved from memory. This retrieved machine code is illustrated as the irrigation engine 608. The operating system emulator 612 emulates the operating system of the irrigation control unit/s (e.g., the AVR operating system of the various satellite controllers) that the irrigation engine 608 is developed for such that the irrigation engine 608 behaves as if it were in its native operating system. In the event emulation code is not required due to the nature of the source code upon which the retrieved machine code is based, there is no operating system emulator 612 or it is bypassed.

In operation, the simulator 606 executes the dry run by causing the irrigation engine 608 to execute in the emulated operating system. Thus, all operating system function calls generated by the irrigation engine 608 are processed by the operating system emulator 612 to be compatible with function calls of the host operating system (e.g., the WINDOWS operating system). In order to expedite the simulation, the simulator 606 advances the time rapidly by sending clock ticks to the operating system emulator 612. This in turn causes the operating system emulator 612 to notify the irrigation engine 608 that time has advanced. The raw output data (e.g., the status of a given valve or other data) is output from the irrigation engine 608 back to the simulator 606, which is routed to the dry run simulation manager 604, then to the data processor 610 to be translated into a user readable or understandable form back to the GUI 602 for display.

It is noted that each of the functional components of FIG. 6 are implemented as executable machine code stored on the irrigation control unit functioning as a central controller. In preferred form, the executable machine code is referred to as software; however, such functional components may be implemented as software, firmware, hardware or any combination thereof. It is noted that generically, these functional components are stored and executed in an irrigation control unit that seeks to simulate an irrigation control function of a lower layer irrigation control unit within a hierarchical control structure. For example, in preferred form the functional components are stored within an irrigation control unit functioning as a central controller 102 in order to simulate the functionality of one or more irrigation control units functioning as satellite controllers 104. However, it is understood that the same components could be used to simulate the functionality of one or more supervisor controllers 202. Furthermore, these components could be stored in an irrigation control unit functioning as a supervisor controller 202 in order to simulate the functionality of one or more satellite controllers 104. It is noted that the embodiments of the invention described in connection with FIG. 6 may also be implemented in an irrigation control system that does not have a hierarchical control structure, e.g., a peer-to-peer control structure.

Figure 7:
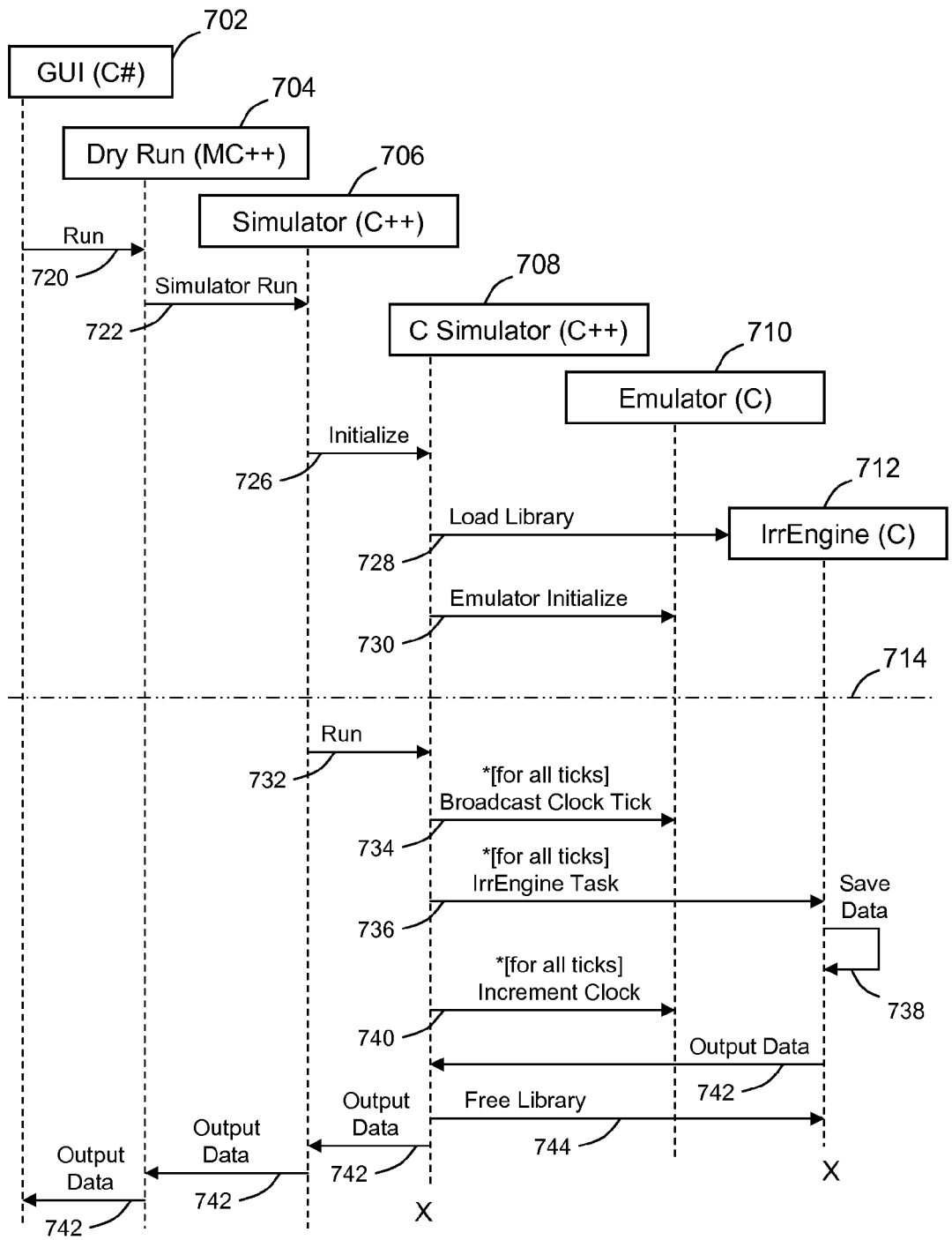
FIG. 7 is a sequence diagram for the execution of an executable application in an upper control layer irrigation control unit that executes an irrigation control function of one or more remote irrigation control units in accordance with several embodiments.

Referring next to FIG. 7, one embodiment of a sequence diagram is shown for the sequence of events during the execution of an executable application by an irrigation control unit that simulates an irrigation control function of one or more remote irrigation control units, the executable application containing machine code based on ported source code that was the basis for machine code operating in the one or more remote irrigation control units. For example, the sequence diagram illustrates steps performed by the processor 408 of irrigation control unit 402 of FIG. 4. The memory 410 stores the executable application, which includes emulation machine code 452 (as needed) and machine code 448 and 450 (which corresponds to machine code 430 and 432 stored in one or both of irrigation control units 404 and 406). In this embodiment, the machine code 448 and 450 that is part of the simulation portion of the executable application comprises at least a portion of the irrigation engine of the remote irrigation control units, and in preferred form, this irrigation engine is used for simulation or dry run purposes in a central control irrigation application.

The diagram of FIG. 7 also illustrates the major classes of software of the simulation portion of the executable application used in performing the simulation or emulation of one or more irrigation control units. For example, the following classes are shown: graphical user interface (GUI) 702, Dry Run 704, Simulator 706, C Simulator 708, Emulator 710 and IrrEngine 712. An instance of each class is referred to herein as an object. Relative to that shown in FIG. 6, in one embodiment, GUI 702 corresponds to GUI 602, Dry Run 704 corresponds to the Dry Run Simulation Manager 604, the Simulator 706 and the C Simulator 708 correspond to the simulator 606, the Emulator 710 corresponds to the operating system emulator 612 and the IrrEngine 712 corresponds to the irrigation engine 608.

In preferred form, the GUI 702 is based on source code written in C Sharp (C#), the Dry Run 704 is based on source code written in managed C++, the Simulator 706 is based on source code written in C++, the C Simulator 708 is based on source code written in C++, the emulator 710 is based on source code written in C and the IrrEngine 712 is based on source code written in C.

Generally, the GUI 702 comprises all instructions needed to implement an interface for the user. For example, the GUI 702 should be capable of generating display graphics that prompt the user to input the various parameters of the simulation to be performed. In one example of a dry run, a user should be provided an opportunity to input changes to one or more water and programs and/or irrigation stations. Additionally, a user may be provided an opportunity to enter specific firmware version of the remote irrigation control units to be simulated.

The Dry Run class 704 is a collection of functions that call other functions in other classes to initiate the dry run feature. In preferred form, it is created as a managed C++ project in order to bridge between the GUI which is written in C# and the C header files (.h files) of the IrrEngine 712. Thus, the Dry Run 704 directly uses header files from the IrrEngine 712, which avoids the need for duplicate code and also guarantees that if the firmware or machine code data structures change, they will automatically be updated in the Dry Run object 704. Additionally, since it is managed C++, it is very easy to call from C# code, or any other language that adheres to the Common Language Specification (CLS Standard). This also allows strong compile time checks of method signatures and parameter types.

The Simulator class 706 is not an object, rather it is an application program interface (API) function call to the C Simulator class 708. The C Simulator 708 is the actual simulation code that executes the dry run or simulation feature. The C Simulator 708 causes the correct version of the machine code to be loaded from memory to the IrrEngine 712. This allows the simulation feature to run using different firmware versions corresponding to different remote irrigation control units. This allows the C Simulator 708 work with many firmware or machine code versions. It also advances the clock in the AVR emulator 710 for each cycle of a loop at an accelerated rate in order to drive the simulation. At the end of each cycle of a loop, the C Simulator 708 examines the data structures of the IrrEngine 712 to determine the state of all outputs. In preferred form, each cycle is one second. At the end of each simulated second time, the C Simulator 708 examines the data structures of the IrrEngine 712 to determine the state of all outputs. This data is collected and stored for every second or other length of time (granularity), e.g., saved every minute.

As can be seen, in this preferred embodiment, the simulator functionality is divided into two simulator classes: Simulator 706 and C Simulator 708. In preferred form, this is done to minimize the processor invoke (PlatformInvoke) function calls from the Dry Run 704 which is written in managed C++. As is well known, any function call from managed code to unmanaged code is expensive in terms of processor time. Thus, the sequence is designed such there is only one function call from the object of the Dry Run class 704. The remaining function calls are executed by the C Simulator class 706, which is written in unmanaged C++.

An object of the Emulator 710 corresponds to emulation machine code 452 and is a collection of API functions that perform the equivalent of what would happen in the operating system native to the remote irrigation control units. In one example, the Emulator 710 performs the Intel x86 equivalent of all necessary AVR API functions in the WINDOWS operating system. All necessary AVR API functions are ported into the executable application since the IrrEngine 712 makes frequent calls to the AVR API.

The IrrEngine 712 is the actual machine code or firmware that functions at least nearly identically to machine code or firmware found in the remote irrigation control units to be simulated. As described above, this machine code is based on source code that was ported into the development environment for the operating system executing the executable application. When porting the source code, in some embodiments, slight modifications may be made to ensure that this code would properly translate into machine code executable on a personal computer. The machine code also writes all the outputs to memory array for analysis by the C Simulator 708. By executing the machine code that functions exactly as the machine code of the remote irrigation control units to be simulated, simulations are extremely accurate to actual operation in the field.

The major steps shown in FIG. 7 illustrate initialization of the program and the execution of the program. For example, everything above line 714 represents steps used to initialize the simulation, and the steps below line 714 represent steps involved in the execution of the simulation. Initialization involves setting all dry run specific parameters such as program start times and durations, station terminal numbers, watering schedules, flow rates of stations, etc. Much of this information has already been entered by the user in setting up watering schedules or provided by the satellite controllers in response to queries from the central controller. In preferred form, the execution involves emulating the operating system of the remote irrigation control unit and running equivalent machine code to that machine code running in the remote irrigation control units. Other embodiments do not require emulation. The execution also involves accelerating time so that the user can get a prompt simulation result. Although not specifically illustrated, the last steps involve the processing of the data output from the simulation to a user readable format. It is noted that generally, the arrows of FIG. 7 each represent a function call from the object of one class to the object of another class.

Following the sequence of FIG. 7, the user initiates the simulation feature of the executable application via the GUI 702, which in this case is a dry run feature of central irrigation control application. Depending on the specific user interface, the user inputs the parameters of the dry run feature and may instruct the program which machine code or firmware version of the remote irrigation control units is to be used. However, specific firmware versions of different remote irrigation control units to be simulated may already be known to the application. In other embodiments, the GUI 702 has already automatically requested or requests that the remote irrigation control units controlled by the central control application announce what firmware version they are using.

To initiate the dry run, the GUI 702 calls a Run function call 720 which creates an instance or object of the Dry Run 704 that calls a Simulator Run function call 722. Additionally, the Dry Run 704 uses other function calls (not shown) to initialize the real time clock of the Emulator 710 to the starting time of the simulation and initializes simulation parameters. The Simulator Run function call 722 creates an instance of the Simulator 706. The Simulator 706 object then creates a new instance of the C Simulator 708. The other API function calls of the Simulator 706 include the Initialize function call 726 that initializes the C Simulator object and the Run function call 732 that causes the C Simulator object to begin the simulation. The Initialize function call 726 triggers the object of the C Simulator 708 to use a Load Library function call 728 to cause the IrrEngine 712 object to retrieve the proper machine code version for the remote irrigation control unit/s to be simulated from memory for the IrrEngine 712 object. Thus, the IrrEngine 712 object includes the irrigation engine machine code that is based on the ported source code as described herein. The IrrEngine 712 can be any one or more different versions of the different remote irrigation control units as well as different firmware version of the different remote irrigation control units. The machine code is retrieved from memory. In preferred form, different sets of machine code are stored according to file names. For example, the file name for a given machine code version is IrrEngine.<v>.dll, where the variable <v> is the version of the machine code. In cases where the specific machine code version is not known for a given remote irrigation control unit, a generic machine code set is stored as IrrEngine.øø.dll. It is noted that additional machine code or firmware versions of irrigation controllers to be simulated may be developed after the central control application is developed and be loaded into the irrigation control unit functioning as the central controller as the new firmware versions become available. These firmware versions are simply .dll files stored in the central controller. Thus, as a future firmware version is available and ported to the operating system of the central controller, the .dll file for this new version is stored in the location that the other .dll files (each corresponding to different firmware versions) are stored. The C Simulator 708 object also calls an Emulator Initialize function call 730 which creates an instance of the Emulator 710 object and initializes it for the simulation. Again, the Emulator 710 represents code that was used to emulate the native operating system (e.g., the AVR operating system) of the remote irrigation control units within the operating system of the central controller (e.g., a WINDOWS operating system). It is noted that in embodiments where emulation is not required, the Emulator Initialize function call 730 is not called. At this point the application is initialized and ready to be executed.

The Run function call 732 causes the C Simulator 708 object to begin the simulation. For a number of iterations of a loop, the C Simulator 708 object calls the Broadcast Clock Tick function call 734, the IrrEngine Task function call 736, and Increment Clock function call 740. The Broadcast Clock Tick function call 734 sends a time clock tick to the Emulator 710 object. The IrrEngine Task function call 736 runs the IrrEngine for that time tick. In other words, this function call causes the execution of the machine code for the new clock advance. The Increment clock function call 740 increments the real time clock of the Emulator object. Every time the IrrEngine object runs for the particular time tick, it saves data 738 (such as the state of irrigation stations) to a memory array. This array is updated every iteration of the execution of the dry run.

During the simulation, the Emulator 710 object emulates the operating system of the remote irrigation control units that are to be simulated. Thus, the Emulator 710 emulates all function calls that the IrrEngine 712 expects. From the point of view of the IrrEngine 712 object, it behaves as if it were within the remote irrigation control unit it was intended to operate in. It is noted that the Emulator may be obtained, developed as part of the development of the executable application or may be purchased from the developer of the operating system. In embodiments where emulation is not needed, the function calls of the C Simulator 708 are direct to the native operating system (since they are not required to be translated into a format understood by the native operating system).

Once the number of iterations is complete, which will vary depending on how long the user selects the simulation, the C Simulator 708 object calls the Free Library function call 744 to release the specific version of machine code of the IrrEngine 712, i.e., to unload the machine code. At this point, the instance of the IrrEngine 712 object is destroyed (indicated in FIG. 7 by an "X") and then the instance of the C Simulator 708 object is destroyed.

Output Data 742 is not necessarily a function call, but is shown to illustrate the flow of data back to the GUI 702. It is noted that the data saved to an array by the IrrEngine 712 object is raw data that requires processing to turn it into useful human readable data. For example, the data from the array is processed by the data processor 610 of FIG. 6 prior to being displayed by the GUI 702.

Figure 8:
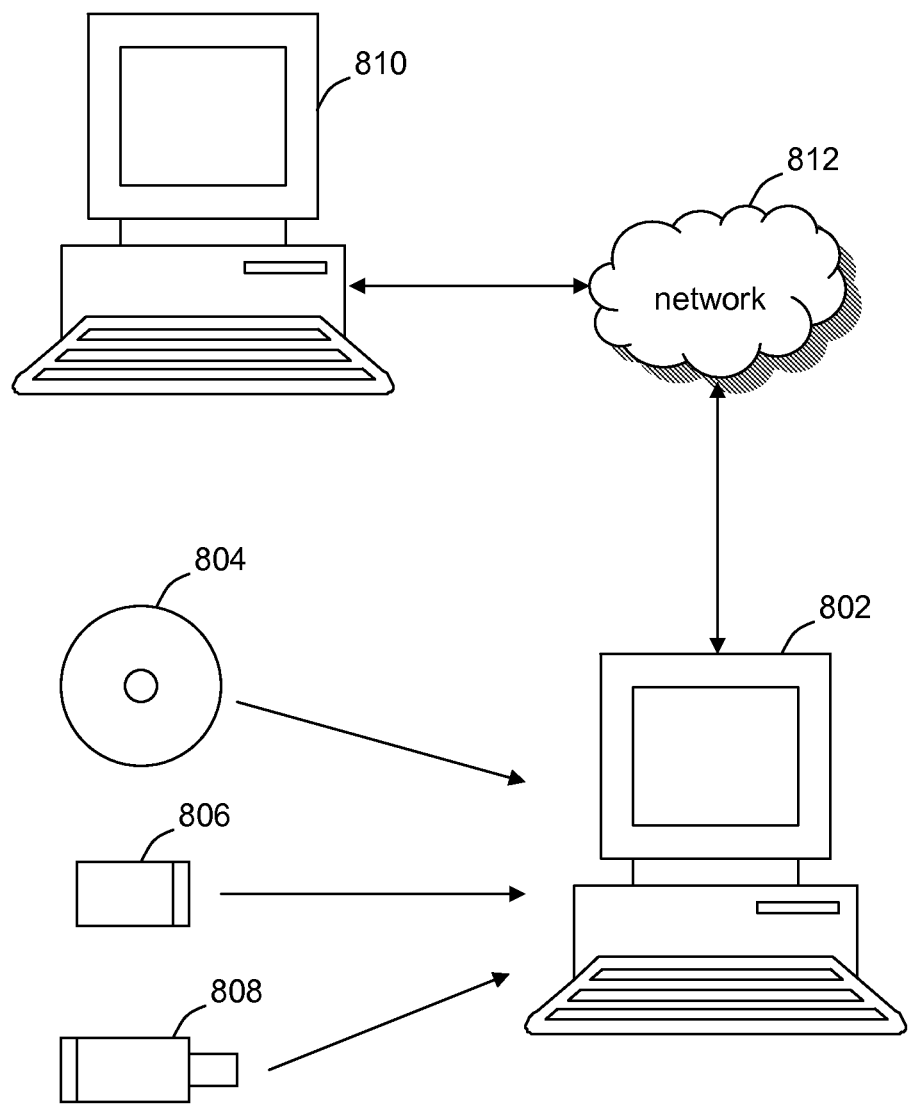
FIG. 8 is a diagram illustrating various ways in which an executable application is provided to the irrigation control unit that functions as a central irrigation controller.

Referring next to FIG. 8, a diagram illustrates various ways in which an executable application is provided to the irrigation control unit 802 that functions as a central irrigation controller 102. In preferred form the irrigation control unit 802 is a general purpose computer device having a general purpose operating system, such as a personal computer or a server. The executable application or program (e.g., application machine code 446) may be provided in a variety of ways. For example, the application machine code may be stored on a variety of different types of computer readable mediums, such as a compact disc (CD) 804 (or digital video disc (DVD)), flash memory 806, universal serial bus (USB) drive 808, etc. which is delivered to and copied into the memory of the irrigation control unit 802 via the appropriate input. In preferred embodiments, the application is copied and installed in the computer readable medium or memory 410 (e.g., a hard drive, ROM, RAM, flash memory, etc.) of the irrigation control unit 802. In some embodiments, the application machine code is stored in the computer readable medium (e.g., memory, hard drive, etc.) of a remote server 810 or computer such that the irrigation control unit 802 may download the application machine code from the remote server 810 via the computer network 812. The downloaded machine code is copied into the irrigation control unit and installed for execution. In another embodiment, the application machine code is stored and installed on the remote server 810 coupled to the irrigation control unit 802 via the computer network 812, where the application machine code is available for execution by the remote server 810 upon request by the irrigation control unit 802. Accordingly, the remote server 810 functions as an application server that executes the application machine code for the benefit of the irrigation control unit 802. Any outputs or results of the application machine code may be downloaded to the irrigation control unit 802. Again, future machine code or firmware versions (e.g., new .dll files) of various irrigation control units available after the development of the executable central control application may be provided to the irrigation control unit 802 in a similar manner, e.g., transferred to using a medium or downloaded to the irrigation control unit or remotely stored and executed at the request of the irrigation control unit 802.

Figure 9:
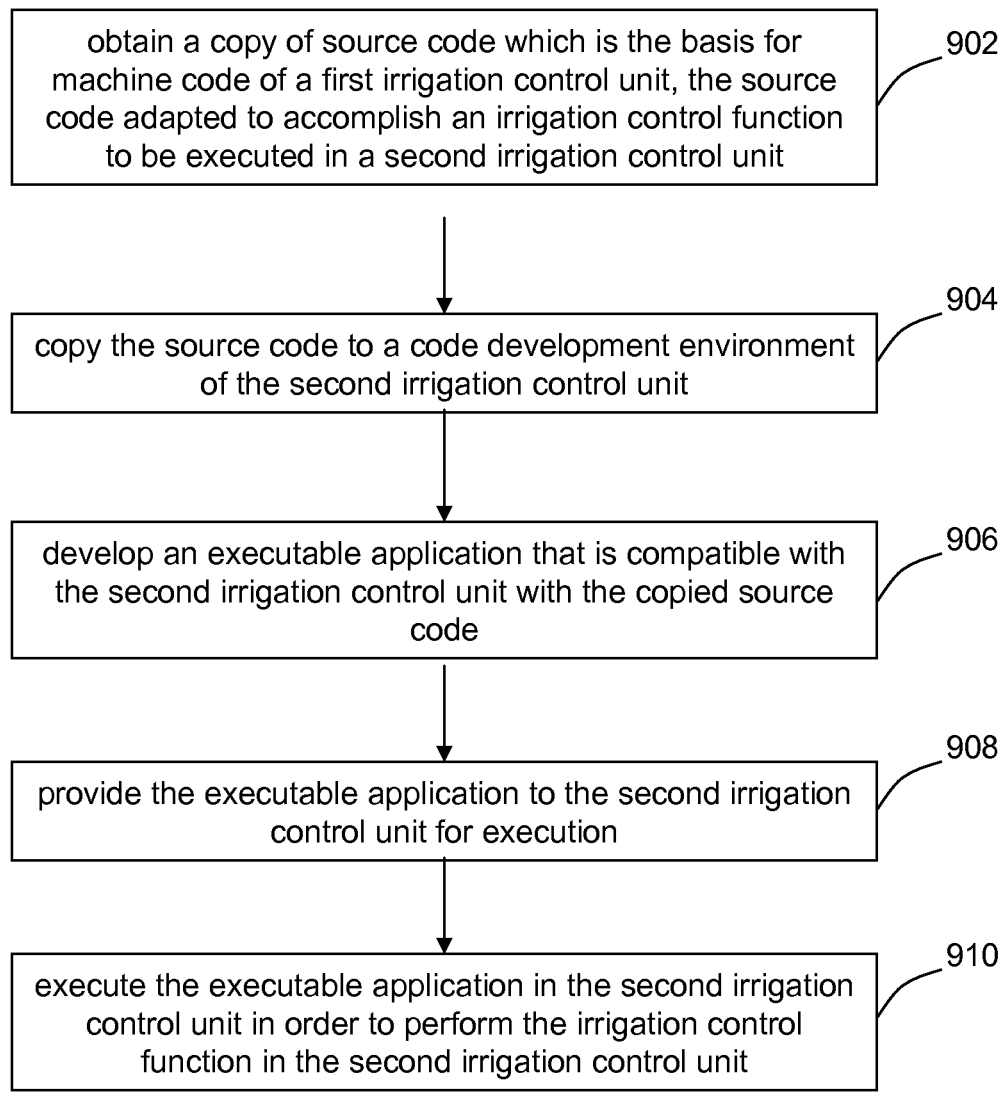
FIG. 9 is a flowchart illustrating steps performed in the development and running of an executable application according to several further embodiments of the invention.

Referring next to FIG. 9, a flowchart is shown illustrating steps performed in the development and running of an executable application according to several further embodiments of the invention. It is noted that the steps of FIG. 9 also generically represent the steps of FIG. 5. Similar to the method of FIG. 5, this method provides for a way to implement an accurate execution of an irrigation control function of one irrigation control unit in another irrigation control unit. For example, in a central control irrigation system, features of some central irrigation control applications allow a central controller to execute functionality of one or more remote irrigation control units, such as a supervisor controller or a satellite controller. Such execution may be for the execution or implementation of the functionality in addition to or instead of the implementation of that functionality by the remote irrigation control units, or may be for purposes of simulating that functionality for analysis purposes. In these embodiments, it is desirable to re-use the same previously developed source code base for which previously, concurrently or future developed machine code of one or more remote irrigation controllers is based. This previously developed source code base may be use to separately develop new code for an executable application running in another controller having a same or different operating system as that found in the one or more remote irrigation controllers, as well as may be used in a control system that does or does not have a hierarchical control layer structure.

Thus, according to several embodiments, a copy of source code which is the basis for machine code of a first irrigation control unit is obtained, the source code adapted to accomplish an irrigation control function to be executed in a second irrigation control unit (Step 902). In this embodiment, the source code for the first irrigation control unit has been previously developed by a coding team. Rather than developing new source code and corresponding machine code from the ground up, the coding team developing the executable application for the second irrigation control unit reuses this previously developed code. Similar to that described above, a copy of the relevant portion of the source code specific to a given irrigation control unit whose functionality is to be executed is copied from a source code repository. It is noted that copies of different versions of source code corresponding to different firmware or machine code versions of a given irrigation control unit may be obtained. The portion of the source code obtained depends on the function to be executed. For example, in the system seeking to execute the operation of an irrigation control unit for irrigation engine execution purposes (e.g., to execute irrigation schedules) or for simulation purposes such as a dry run, the portion of the source code comprising the irrigation engine is obtained. It is also noted that rather than simply obtaining a copy of a portion of the source code, a copy of the entire source code governing the entire operation of a particular irrigation control unit may be obtained. In a preferred embodiment, the portion of the source code comprising the irrigation engine is obtained.

Next, the obtained source code is copied to a code development environment of the second irrigation control unit (Step 904). In embodiments where the operating system of the second irrigation control unit is the same or a related to operating system to that native to the first irrigation control unit (e.g., both control units use a WINDOWS operating system, both use an AVR operating system, or one uses WINDOWS and one uses WINDOWS CE), the obtained source code is simply copied to the code development environment. However, in embodiments where the operating system of the second irrigation control unit is different than that native to the first irrigation control unit (e.g., one control unit uses an AVR operating system and the other uses a WINDOWS operating system), the step of copying includes porting the obtained source code to the code development environment of the second irrigation control unit, such as described in Step 504 of FIG. 5.

Then, an executable application compatible with the second irrigation control unit with the copied source code is developed (Step 906). In preferred embodiments, the second irrigation control unit is either a supervisor controller 202 or a satellite controller 104. Step 906 involves the writing, developing or building of the source code for the application itself including the copied source code. In embodiments where the operating system of the second irrigation control unit is different than that native to the first irrigation control unit and the source code is ported to the new development environment, Step 906 also involves the developing of all source code that interacts with the ported source code, such as described in Step 506 of FIG. 5. Step 906 also includes any steps involved in transforming the source code into executable machine code. These step(s) include translating the source code into object code and then into machine code and includes assembling, compiling, interpreting and/or linking to generate the executable application including executable machine code. In preferred form, the application source code is created using the programming language C or a variation thereof.

Once the executable application is developed, this executable application is provided to the second irrigation control unit for execution (Step 908). The executable application or program may be provided in a variety of ways, such as described in Step 508 of FIG. 5 and as described in connection with FIG. 8.

Next, the executable application is executed in the second irrigation control unit in order to perform or execute the irrigation control function in the second irrigation control unit (Step 910). This is usually triggered by a user via input through a graphical user interface and other inputs, such as a keyboard and mouse.

In embodiments where the operating system of the second irrigation control unit is the same or a related to operating system to that native to the first irrigation control unit, the machine code of the executable application retrieves the proper machine code corresponding to the function of the first irrigation control unit to be executed. However, since the operating systems are at least related, emulation machine code is not needed. That is, the application machine code simply executes the machine code that is re-used from the first irrigation control unit. In this manner, the executable application functions identically or nearly identically to the machine code that is running in the first irrigation control unit. It is also noted that in some embodiments, even if the operating systems are not related, emulation machine code may not be required if the obtained and copied source code has been written to be compatible with the operating systems of both the first and second irrigation control units.

In embodiments where the operating system of the second irrigation control unit is different than the operating system of the first irrigation control unit, similar to that described above, the executable application retrieves from memory the proper version of the machine code that corresponds to each remote irrigation control unit to be executed. This machine code is executed by emulating the native operating system of the machine code of the remote irrigation control unit (e.g., supervisor controller or satellite controller) within the operating system of the irrigation control unit functioning as the central irrigation controller. In this way, the executable application emulates at least a portion of the operating system of the first irrigation control unit from the perspective of the machine code such that the machine code will behave exactly or nearly exactly as it does in its native operating system under nominal conditions. It is understood that certain real-time conditions can alter the actual operation, such as rain delays, leaks, broken pipes, pumps failures, wind, etc. Again, it is noted that in some embodiments, the machine code is executed without the need to emulate the native operating system of the machine code of the remote irrigation control unit within the operating system of the irrigation control unit functioning as the central irrigation controller (or supervisor controller).

It is noted that in embodiments where the operating system of the second irrigation control unit (e.g., the central controller 102 or the supervisor controller 202) is the same or a related to operating system to that native to the first irrigation control unit (e.g., the supervisor controller 202 or the satellite controller 104) or where emulation is not needed since the copied source code is already compatible with both operating systems, the functional block diagram of FIG. 6 is similar, except that the operating system emulator 612 is not needed. The irrigation engine 608 corresponds to the machine code for one or more remote irrigation control units whose functionality is to be simulated. Since this machine code as originally developed is compatible with the operating system of the control unit running the executable application, the emulator 612 is not needed. Similarly, the sequence diagram of FIG. 7 does not require the Emulator 710. The Load Library function call 728 causes the proper machine version of the remote irrigation control unit to be retrieved from memory, but since this previously developed and re-used machine code is already compatible with the operating system of the control unit running the executable application, the emulator 710 is not needed. The function calls 734 and 740 from the object of the C Simulator 708 directly cause the function of the respective call to be executed since these functions do not need to be emulated. Function call 730 calls an empty function. Function call 734 broadcasts a clock tick to the IrrEngine 712, function call 736 executes the IrrEngine 712 for that clock tick, and function call 740 increments the clock for the simulation. Thus, generally, in these embodiments, the simulation feature is initialized, executed and the saved data is processed and displayed in a user readable format.

In some embodiments, the execution of the executable application (Step 910) performs the irrigation control function in the second irrigation control unit in order that the second irrigation control unit execute or implement the irrigation control function in addition to or instead of the execution of that function in the first irrigation control unit. In one example, the second irrigation control unit functions as a central controller 102 (or supervisor controller 202) that directly controls a first irrigation control unit functioning as a supervisor controller or a satellite controller, e.g., satellite controllers 104A and 104B. This allows the central controller 102 to function not only as a central controller, but also as a satellite controller (or supervisor controller). In such case, the executable application includes the functionality to output signaling to cause or implement the result of the irrigation control function. That is, referring to FIG. 6, the Dry Run Simulation Manager 604 and the Simulator 606 take the form of an Irrigation Manager and an Irrigation Executor, respectively, causing the execution of the Irrigation Engine 608 using the Operating System Emulator 612 as needed. Referring to FIG. 7, the Dry Run 704 and the Simulator 706/C Simulator 708 also take the form of an Irrigation Manager and an Irrigation Executor, respectively. In such case, the Irrigation Executor causes the execution of the IrrEngine 712 (using the Emulator 710 as needed) in real-time, i.e., not on an accelerated basis. Additionally, the output data is not necessarily be saved at each clock tick. Instead, additional commands or control signaling are generated by the IrrEngine and/or Irrigation Executor to cause the resulting action of the IrrEngine to be implemented. For example, when the execution of a clock tick results in a decision to begin watering at a given station of a satellite controller, the Executor/IrrEngine outputs the necessary signaling to send signaling (command/s) to the satellite controller to cause the station to begin watering (i.e., to implement the irrigation control function). In this way, the second irrigation control unit of the method of FIG. 9 can function as the first irrigation control unit (e.g., a satellite controller or a supervisor controller) as if it were such a controller. Such operation is in addition to concurrent operation of the irrigation control function by the first irrigation control unit or instead of such operation by the first irrigation control unit. In some embodiments, the outputs are still stored for analysis purposes, even if not done on an accelerated basis.

While the invention herein disclosed has been described by means of specific embodiments, examples and applications thereof, numerous modifications and variations could be made thereto by those skilled in the art without departing from the scope of the invention set forth in the claims.

What is claimed is:

1. An irrigation control device comprising:
   a first processor of a first irrigation control unit; and
   a computer readable medium coupled to the first processor and storing a first set of machine code adapted to be executed by the first processor, the first set of machine code based on a portion of source code on which a second set of machine code stored in a second irrigation control unit is based, wherein the first set of machine code and the second set of machine code are not identical to each other, wherein the computer readable medium does not store the second set of machine code;
   the second irrigation control unit having a predefined hierarchical control relationship with the first irrigation control unit;
   wherein the second set of machine code is adapted to be executed by a second processor of the second irrigation control unit.

2. The irrigation control device of claim 1 wherein the first set of machine code is adapted to implement a first operating system when executed by the first processor, wherein the first operating system is at least related to a general purpose computer operating system of a general purpose computer functioning as the second irrigation control unit, the second set of machine code implementing the general purpose operating system.

3. The irrigation control device of claim 2 wherein the first operating system comprises a variant of the general purpose computer operating system specifically designed for use in embedded devices.

4. The irrigation control device of claim 1 further comprising:
operating system machine code stored on the computer readable medium and adapted to be executed by the first processor to implement a first operating system; and
application machine code stored on the computer readable medium and adapted to be executed by the first processor to provide an irrigation control application, the application machine code including the first set of machine code;
wherein the first set of machine code is based on the portion of the source code on which the second set of machine code stored in the second irrigation control unit operating in accordance with a second operating system is based, the second set of machine code adapted for use in the second operating system and to accomplish an irrigation control function when executed,
wherein the first processor is adapted to execute the application machine code to execute the irrigation control function in the first operating system by executing the first set of machine code.

5. The irrigation control device of claim 4 wherein the second operating system is different than the first operating system.

6. The irrigation control device of claim 5, wherein the first processor is adapted to execute the application machine code to execute the irrigation control function in the first operating system by emulating at least a portion of the second operating system within the first operating system and executing the first set of machine code.

7. The irrigation control device of claim 5, wherein the first processor is adapted to execute the application machine code to execute the irrigation control function in the first operating system without emulating at least a portion of the second operating system within the first operating system and executing the first set of machine code.

8. The irrigation control device of claim 4 wherein the first processor is adapted to execute the application machine code to simulate the irrigation control function in the first operating system by executing the first set of machine code.

9. The irrigation control device of claim 4 wherein the first processor is adapted to execute the application machine code to execute the irrigation control function in the first operating system and output signaling to implement the executed irrigation control function.

10. The irrigation control device of claim 4 wherein the first set of machine code is separately developed after development of the second set of machine code.

11. A method of operation in irrigation control comprising:
retrieving a first set of machine code stored in a first irrigation control unit that is based on a portion of source code on which a second set of machine code stored in a second irrigation control unit is based, the first set of machine code and the second set of machine code not identical to each other, the second irrigation control unit having a predefined hierarchical control relationship with the first irrigation control unit, wherein the first irrigation control unit does not store the second set of machine code;
executing the first set of machine code by a first processor of the first irrigation control unit; and
executing the second set of machine code by a second processor of the second irrigation control unit.

12. The method of claim 11 wherein the first set of machine code is adapted to implement a first operating system when executed, wherein the first operating system is at least related to a general purpose computer operating system of a general purpose computer functioning as the second irrigation control unit, the second set of machine code implementing the general purpose operating system.

13. The method of claim 12 wherein the first operating system comprises a variant of the general purpose computer operating system specifically designed for use in embedded devices.

14. The method of claim 11 further comprising:
executing operating system machine code to implement a first operating system; and
wherein the retrieving the first set of machine code step comprises:
retrieving application machine code stored in the first irrigation control unit, the application machine code including the first set of machine code, wherein the first set of machine code is based on the portion of the source code on which the second set of machine code stored in the second irrigation control unit operating in accordance with a second operating system is based, the second set of machine code adapted for use in the second operating system and to accomplish an irrigation control function when executed; and
wherein the executing the first set of machine code step comprises:
executing the application machine code to execute the irrigation control function in the first operating system by executing the first set of machine code.

15. The method of claim 14 wherein the second operating system is different than the first operating system.

16. The method of claim 15, wherein the executing the application machine code step comprises:
executing the application machine code to execute the irrigation control function in the first operating system by emulating at least a portion of the second operating system within the first operating system and executing the first set of machine code.

17. The method of claim 14, wherein the executing the application machine code step comprises:
executing the application machine code to simulate the irrigation control function in the first operating system by emulating at least a portion of the second operating system within the first operating system and executing the first set of machine code.

18. The method of claim 14 wherein the first set of machine code is separately developed after development of the second set of machine code.

19. An irrigation control device comprising:
a first processor of a first irrigation control unit; and
a computer readable medium coupled to the first processor and storing a first set of machine code adapted to be executed by the first processor to implement a first operating system, wherein the first operating system is at least related to a general purpose computer operating system of a general purpose computer functioning as a second irrigation control unit having a predefined hierarchical control relationship with the first irrigation control unit; and wherein the general purpose computer comprises a second processor adapted to execute a second set of machine code to implement the general purpose operating system;

wherein the computer readable medium does not store the second set of machine code.

20. The first irrigation control unit of claim 19 wherein the first operating system comprises a variant of the general purpose computer operating system specifically designed for use in embedded devices.

21. The first irrigation control unit of claim 19 wherein the first operating system is the same as the general purpose computer operating system.

22. The first irrigation control unit of claim 19 further comprising:

output circuitry coupled to the first processor and adapted to provide irrigation station actuation signals to at least one irrigation station.

* * * * *